United States Patent [19]
Aoki et al.

[11] Patent Number: 5,918,083
[45] Date of Patent: Jun. 29, 1999

[54] CAMERA FOR USE WITH A ROLL PHOTO FILM

[75] Inventors: Nobuhiro Aoki; Shigenori Goto; Hisashi Hamada, all of Saitama, Japan

[73] Assignees: Fuji Photo Optical Co., Ltd., Saitama; Fuji Photo Film Co., Ltd., Kanagawa, both of Japan

[21] Appl. No.: 09/025,453

[22] Filed: Feb. 18, 1998

[30] Foreign Application Priority Data

Feb. 19, 1997 [JP] Japan ..................................... 9-034882
Feb. 19, 1997 [JP] Japan ..................................... 9-034883

[51] Int. Cl.⁶ ................................................... G03B 17/24
[52] U.S. Cl. ........................... 396/406; 396/415; 396/511; 396/538
[58] Field of Search ................................... 396/406, 408, 396/409, 410, 415, 511, 538

[56] References Cited

U.S. PATENT DOCUMENTS 4,623,232 11/1986 Wong et al. ............................ 396/408
4,720,719 1/1988 Hamada et al. ........................ 396/408

FOREIGN PATENT DOCUMENTS 1219486 3/1987 Canada .

*Primary Examiner*—David M. Gray
*Attorney, Agent, or Firm*—Young & Thompson

[57] ABSTRACT

A camera is used with a Brownie photo film, which has a photo filmstrip on which plural frames are formable serially. A light-shielding leader is disposed on a front end of the photo filmstrip. A light-shielding trailer is disposed on a rear end of the photo filmstrip. The Brownie photo film is wound about a supply spool with the trailer positioned inside and with the leader positioned outside. In the camera, a photo film supply chamber is formed for loading of the Brownie photo film. A photo film take-up chamber has a take-up spool disposed in a rotatable manner, for winding the Brownie photo film from the photo film supply chamber. The take-up spool has a spool core, and an insertion slit for receiving insertion of the leader through the spool core. A drive shaft in the photo film supply chamber rotates the take-up spool, to transport the Brownie photo film to the photo film take-up chamber and wind the Brownie photo film about the take-up spool. A motor rotates the drive shaft. A rotational detector switch detects a rotational position of the drive shaft. A controller controls the motor in accordance with a signal from the rotational detector switch, to set the drive shaft in at least one specified rotational position before insertion of the leader into the insertion slit. The insertion slit is directed in a predetermined orientation for facilitating receipt of the leader.

31 Claims, 20 Drawing Sheets

FIG. 16
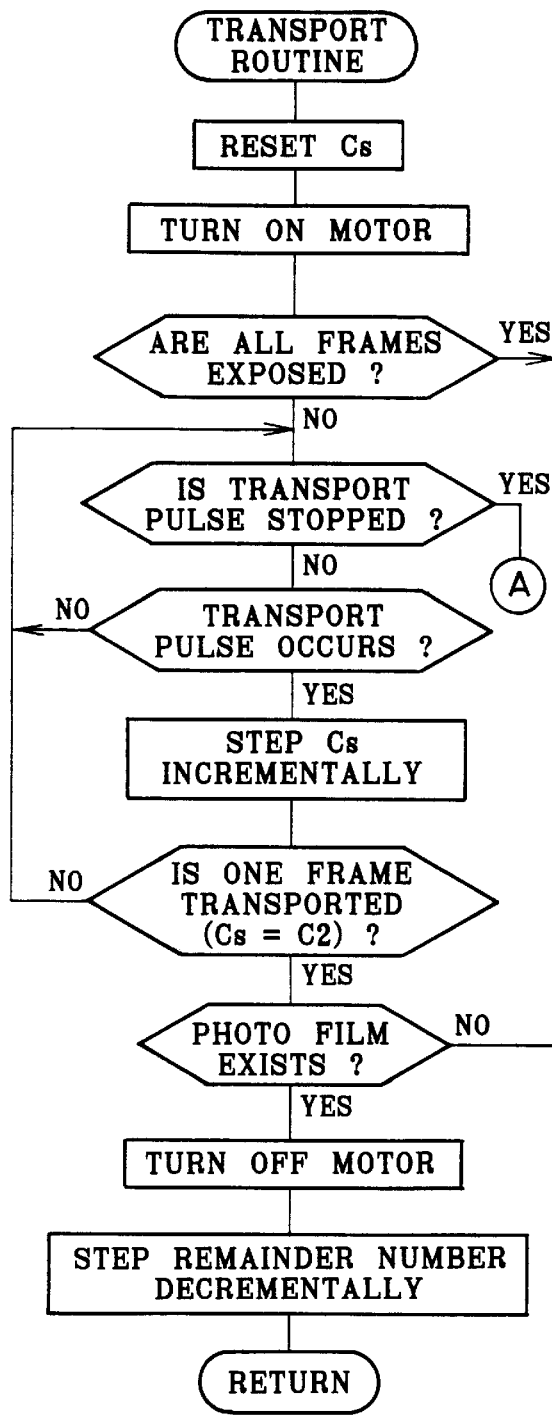
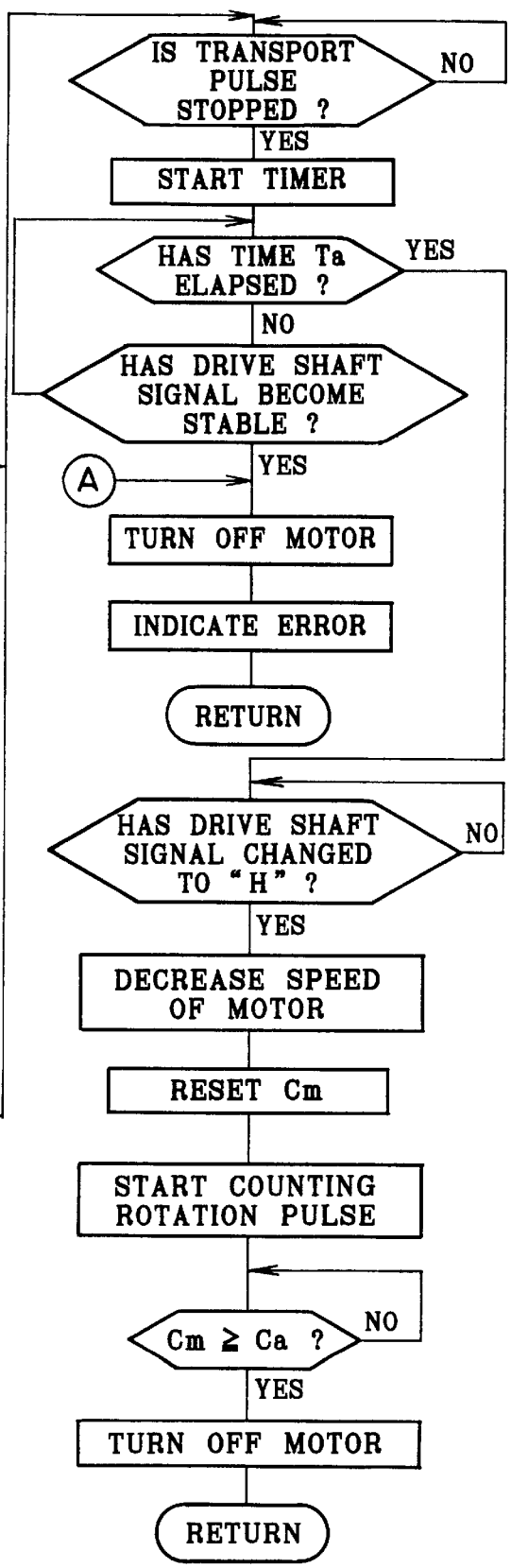

CAMERA FOR USE WITH A ROLL PHOTO FILM

BACKGROUND OF THE INVENTION

1. Field of the Invention

The present invention relates to a camera for use with a roll photo film. More particularly, the present invention relates to a camera for use with a roll photo film, in which a leader of the roll photo film can be inserted in a take-up spool with great ease.

2. Description Related to the Prior Art

There is a roll photo film, in which a medium format photo film is wound in a roll form. The medium format photo film consists of a photo filmstrip being 6 centimeters wide and either one of backing paper and two sheets as leader and trailer. The roll photo film has a spool of which the medium format photo film is wound about a spool core. Examples of the roll photo film are the 120 and 220 types. The 120 type has the light-shielding backing paper including leader and trailer portions, the leader portion being disposed on a front end of the photo filmstrip, trailer portion being disposed on a rear end of the photo filmstrip. The 220 type has the light-shielding leader and trailer sheets, the leader sheet being disposed on a front end of the photo filmstrip, trailer sheet being disposed on a rear end of the photo filmstrip. In the core of the spool is formed an insertion slit, into which the leader is inserted when the spool is used as a take-up spool. Respective ends of the spool core have a flange. In the center of the flange is formed a shaft inserting hole.

The shaft inserting hole is constituted by a circular axial hole and a pair of key ways. The key ways are formed by cutting toward the periphery of the flange from the axial hole. When a photo film supply chamber is loaded with the roll photo film, a support shaft of the camera enters the axial hole of the shaft inserting hole to support the roll photo film in a rotatable manner. The spool being uncovered after removal of entirety of the meduim format photo film is used as the take-up spool. The key portion on the shaft portion of a drive shaft in a photo film take-up chamber comes in engagement with one of the key ways, so that rotation of the drive shaft is transmitted to the take-up spool. A cutting direction of the key ways of the shaft inserting hole is predetermined in relation of the through direction of the insertion slit.

The meduim format camera for use with the roll photo film is loaded with the spool being uncovered and derived from the roll photo film used previously in the form of the take-up spool before the roll photo film is newly loaded. The shaft inserting hole of the take-up spool is engaged with the drive shaft in the photo film take-up chamber. The roll photo film is placed in the photo film supply chamber. An end of a leader of the meduim format photo film is extended and inserted in the insertion slit of the take-up spool in the photo film take-up chamber. Operation of a winder lever or an auto-loader mechanism operable upon closing the back lid causes the drive shaft to rotate the take-up spool, for the purpose of winding the meduim format photo film about the spool core.

After taking exposures, the entirety of the meduim format photo film is wound up about the take-up spool. The back lid is opened. The take-up spool being with the photo filmstrip wound thereon after the exposures is removed from the photo film take-up chamber. The spool being uncovered in the photo film supply chamber will be used as the take-up spool in next operation of taking exposures.

During or after taking a series of exposures, the meduim format photo film is wound. A stop position of the drive shaft in the photo film take-up chamber is changed in a temporary manner of the stop, and depends on any of a length of the meduim format photo film, timing of a finish of photo film winding of the user, and timing of detection of the finish of the photo film winding. When the spool being uncovered is engaged with the drive shaft by way of the take-up spool, it is likely that the insertion slit of the take-up spool stops in an unsuitable position for insertion of the end of the leader due to the stop position of the key portion of the drive shaft. Manual operation of the winder lever or direct manual operation of the take-up spool are required for adjusting the insertion slit in consideration of receiving the leader, to complicate the handling of the camera.

SUMMARY OF THE INVENTION

In view of the foregoing problems, an object of the present invention is to provide a camera for use with a roll photo film, in which a leader of the roll photo film can be inserted in a take-up spool with great ease.

Another object of the present invention is to provide a camera for use with a roll photo film, in which an error or accident in winding operation of the photo film can be recognized reliably.

In order to achieve the above and other objects and advantages of this invention, a camera has a photo film supply chamber formed for loading of the roll photo film. A photo film take-up chamber has a take-up spool disposed in a rotatable manner, for winding the roll photo film from the photo film supply chamber, the take-up spool including a spool core, and an insertion slit, formed through the spool core, for receiving insertion of the leader. A drive shaft is disposed in the photo film supply chamber, for rotating the take-up spool, to transport the roll photo film to the photo film take-up chamber and wind the roll photo film about the take-up spool. A motor rotates the drive shaft. A first detector unit detects a rotational position of the drive shaft. A controller controls the motor in accordance with a signal from the first detector unit, to set the drive shaft in at least one specified rotational position before insertion of the leader into the insertion slit, the insertion slit being directed in a predetermined orientation for facilitating receipt of the leader.

The controller causes the motor to rotate for winding the roll photo film about the take-up spool by a unit length, and to rotate continuously for winding an entirety of the roll photo film about the take-up spool after a final frame is exposed on the photo filmstrip.

In a preferred embodiment, the controller sets the drive shaft in at the least one specified rotational position after an entirety of the photo filmstrip is wound about the take-up spool, the insertion slit of another take-up spool being directed in the predetermined orientation.

The first detector unit detects existence of the drive shaft in at least one reference rotational position, the at least one reference rotational position being predetermined with a predetermined phase difference from the specified rotational position. Furthermore a memory stores at least one predetermined rotating amount, the predetermined rotating amount being predetermined for rotation made by the motor while the drive shaft rotates by the predetermined phase difference. A second detector unit detects a rotating amount of the motor. The controller considers signals from the first and second detector units and the predetermined rotating amount, and stops the motor in response to reach of the rotating amount of the motor to the predetermined rotating amount after the drive shaft reaches the reference rotational position, for setting the drive shaft in the specified rotational position.

The at least one specified rotational position includes first and second specified rotational positions determined with a phase difference of half a rotation therebetween. The at least one reference rotational position includes first and second reference rotational positions determined with the predetermined phase difference respectively from the first and second specified rotational positions.

The first detector unit generates a first drive shaft signal when the drive shaft reaches the first and second reference rotational positions, and generates a second drive shaft signal when the drive shaft reaches the third and fourth reference rotational positions, the third and fourth reference rotational positions being determined with the predetermined phase difference respectively from the third and fourth specified rotational positions.

The first detector unit includes a rotatable disk, rotatable together with the drive shaft. First and second contact patterns are arranged on one face of the disk, and having respective sector shapes, the first contact pattern having a central angle being substantially three times as great as a right angle, and the second contact pattern having a central angle being substantially equal to a right angle. First and second contact segments are disposed to extend to the one face of the disk, arranged with a phase difference of half a rotation with reference to a rotational center of the disk, for contacting the first and second contact patterns, wherein when both the first and second contact segments contact the first contact pattern, then the first and second contact segments are connected to each other, to generate one of the first and second drive shaft signals, and when one of the first and second contact segments contacts the first contact pattern and a remaining one of the first and second contact segments contacts the second contact pattern, then the first and second contact segments are disconnected from each other, to generate a remaining one of the first and second drive shaft signals.

In another preferred embodiment, the first detector unit includes a rotatable disk, rotatable together with the drive shaft. First and second notches are formed in the disk in association with the first and second reference rotational positions, and disposed with a phase difference of half a rotation. A sensor detects the first and second notches to generate a drive shaft signal.

Furthermore an openable lid member closes the photo film take-up chamber, the take-up spool being insertable in the photo film take-up chamber while the lid member is open. The drive shaft is rotated and positioned by external operation while the lid member is open. The controller determines the specified rotational position with a rotational position of the drive shaft positioned by the external operation, and writes the rotational position to the memory.

Furthermore an external input unit is operated externally, for generating a drive shaft set signal. Before insertion of the leader into the insertion slit, the controller sets the drive shaft in the at least one specified rotational position in response to the drive shaft set signal.

An openable lid member closes the photo film take-up chamber, the take-up spool being insertable in the photo film take-up chamber while the lid member is open. A lid switch generates an open signal representing an opened state of the lid member. The controller checks the drive shaft signal generated while the open signal is generated.

In still another preferred embodiment, a photo film roller is rotated by contact with the roll photo film being transported. A roller rotation detector detects rotation of the photo film roller. A timer measures elapsed time. After exposures are taken on an entirety of the photo filmstrip, the controller starts the timer in response to a stop of rotation of the photo film roller, compares the elapsed time with a predetermined time while the roll photo film is wound about the take-up spool, and judges that winding of the roll photo film about the take-up spool is unfinished if a stop of rotation of the drive shaft is detected according to a signal from the first detector unit before reach of the elapsed time to the predetermined time.

BRIEF DESCRIPTION OF THE DRAWINGS

The above objects and advantages of the present invention will become more apparent from the following detailed description when read in connection with the accompanying drawings, in which:

FIGS. 10A–10D are explanatory views in plan and section illustrating relationships in positions of the rotation detector switch and the spool core, among which FIG. 10A illustrates a first reference rotational position, and FIGS. 10B–10D respectively illustrate second, third and fourth reference rotational positions;

FIG. 16 is a flow chart illustrating a transport routine;

DETAILED DESCRIPTION OF THE PREFERRED EMBODIMENTS OF THE PRESENT INVENTION

Figure 1:
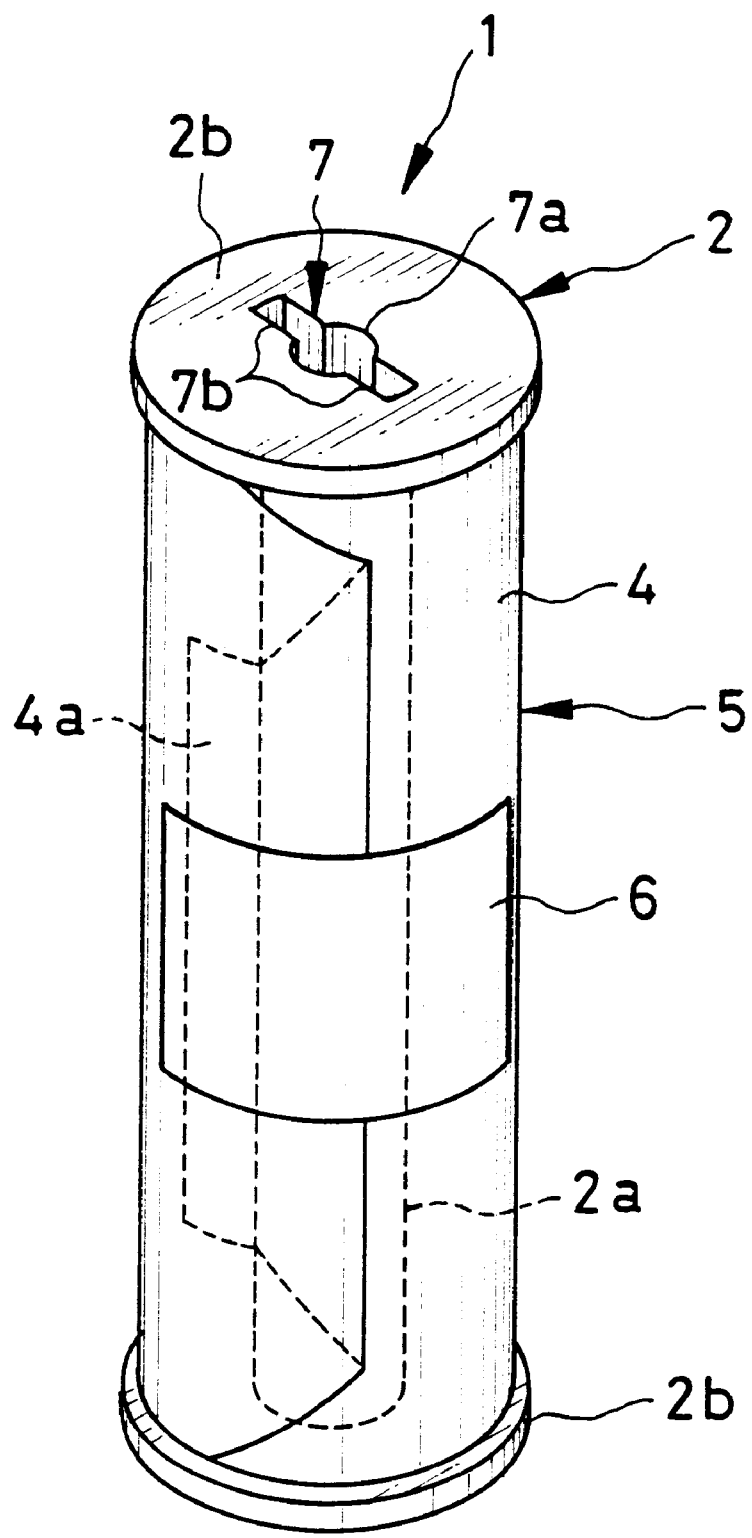
FIG. 1 is a perspective illustrating a meduim format photo film having a roll form.

In FIG. 1, a roll photo film 1 is the 120 type or the 220 type known in the field of photo film. A meduim format photo film 5 is constituted by a photo filmstrip 3 and backing paper 4. See FIG. 2. The meduim format photo film 5 is wound about a spool core 2a of a spool 2. A small portion of a leader 4a of the backing paper 4 is bent and secured by an adhesive tape 6. There are flanges 2b formed with respective axial ends of the spool core 2a. Shaft insertion holes 7 are respectively formed in the center of the flanges 2b.

Each shaft insertion hole 7 is constituted by an axial hole 7a and a pair of key ways 7b. The axial hole 7a is formed in a manner concentric with a rod shape of the spool 2. The key ways 7b are formed by cutting the spool 2 toward the periphery of the flange 2b from the axial hole 7a. The key ways 7b are arranged in positions rotationally different by 180 degrees from each other about the axis of the spool 2, namely with a phase difference of half a rotation. When a photo film supply chamber of a camera is loaded with the roll photo film 1, a support shaft of a rod shape in the camera is inserted in the axial hole 7a of the shaft insertion hole 7, to support the roll photo film 1 in the supply chamber of the camera in a rotatable manner. The spool 2, from which the meduim format photo film 5 is entirely removed after exposures, is used for the next roll of film as a take-up spool. A key portion of a drive shaft of the camera is inserted in the shaft insertion hole 7 and engaged with the key way 7b, for the drive shaft to rotate the spool 2.

Figure 2:
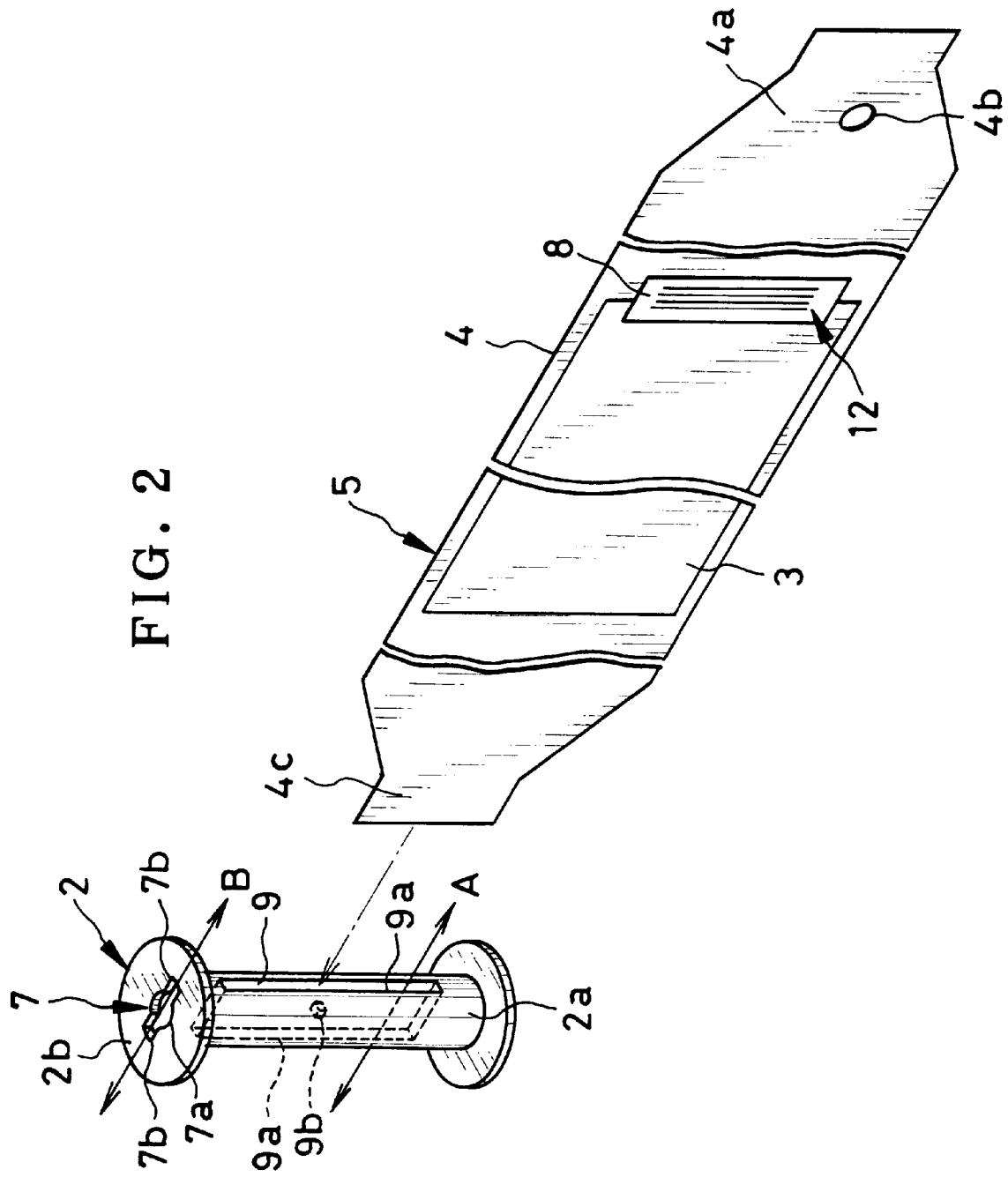
FIG. 2 is a perspective illustrating a spool with the meduim format photo film of the 120 type.

In FIG. 2, the meduim format photo film 5 of the roll photo film 1 of the 120 type as paper-backed type is depicted in a spread state. The photo filmstrip 3 of the roll photo film 1 of the 120 type has two lengths, including a standard length for 15 or 16 exposures and a small length for 8 or 7 exposures, assuming that each frame to be exposed has a size of 41.5×56 mm. With either length, the backing paper 4 is longer than the photo filmstrip 3. The back surface of the photo filmstrip 3 is fitted on a black-color back surface of the backing paper 4. A front end of the photo filmstrip 3 is connected to the backing paper 4 via a connective tape 8. The leader 4a of the backing paper 4 has a hole 4b for engagement with a claw of a take-up spool.

An insertion slit 9 is formed through the spool core 2a of the spool 2. The insertion slit 9 has a pair of insertion entrances 9a which appear on the surface of the spool 2 in a rectangular shape. The insertion entrances 9a are arranged in positions rotationally different by 180 degrees from each other about the axis of the spool 2. In the roll photo film 1 prior to use, a trailer 4c of the backing paper 4 is inserted in the insertion slit 9 through the insertion entrance 9a while the meduim format photo film 5 is wound about the spool core 2a. When the spool 2 becomes a take-up spool, the leader 4a of the backing paper 4 will be inserted in the insertion slit 9 through the insertion entrance 9a. There is a claw 9b disposed in the insertion slit 9 of the spool 2, for engagement with the hole 4b of the leader 4a.

In the spool 2, the insertion slit 9 comes through in a direction A between insertion entrances 9a through the core center of the spool 2. The key way 7b of the shaft insertion hole 7 is cut in a direction B. The direction B is determined equal to the direction A.

Figure 3:
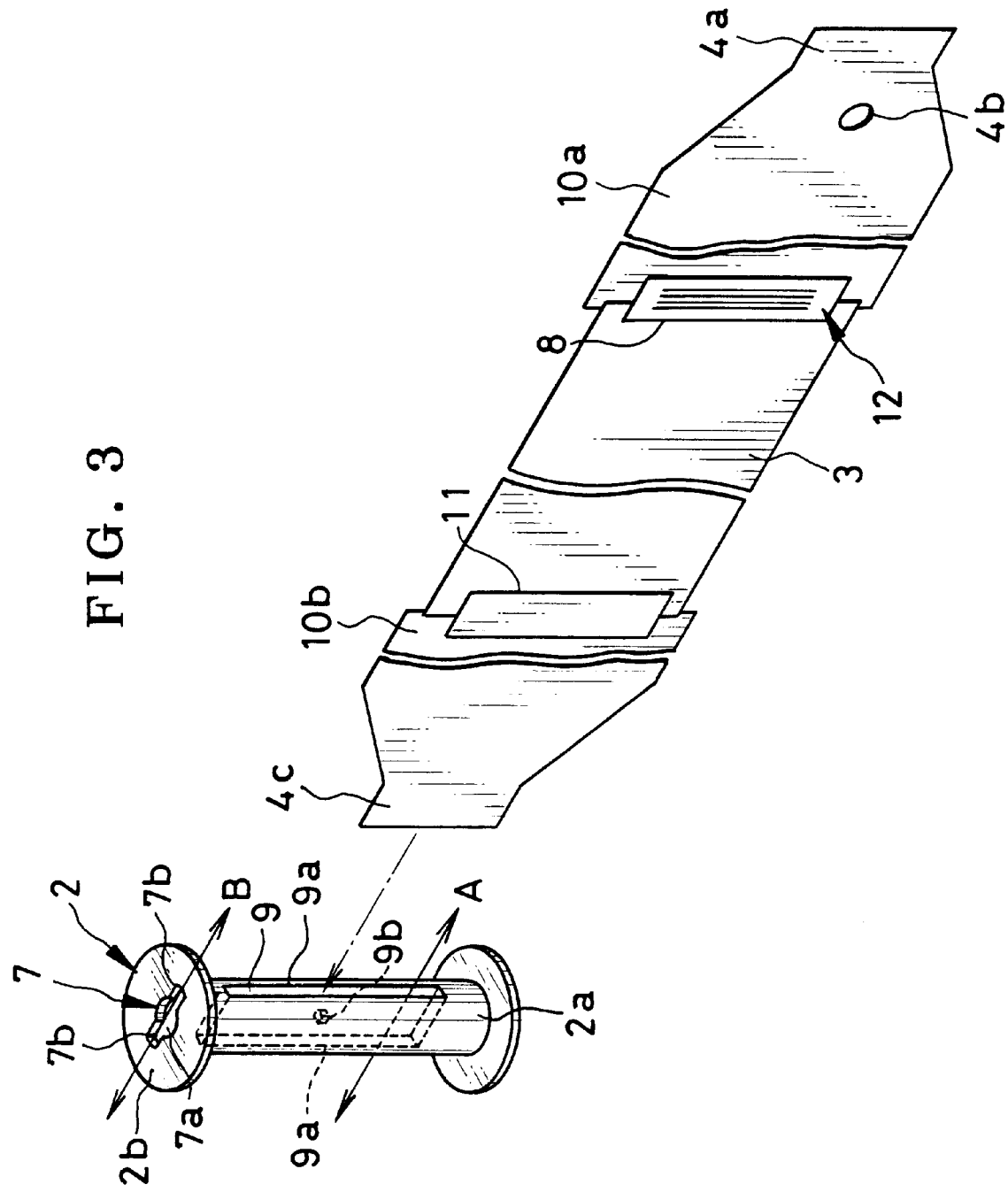
FIG. 3 is a perspective illustrating the spool with a meduim format photo film of the 220 type.

In FIG. 3, the meduim format photo film 5 of the roll photo film 1 of the 220 type as non-paper-backed type is depicted in a spread state. For the backing paper 4 described above, there are a leader sheet 10a and a trailer sheet 10b. The leader sheet 10a is connected to the front end of the photo filmstrip 3 with the connective tape 8. The trailer sheet 10b is connected to the rear end of the photo filmstrip 3 with a connective tape 11. The backing paper 4 does not exist on the back surface of the photo filmstrip 3. The photo filmstrip 3 of the roll photo film 1 of the 220 type has a length for 30 exposures, assuming that each frame to be exposed has the 41.5×56 mm format. Except for those features, the 220 type is the same as the 120 type. Elements of the 220 type similar to those of the 120 type are designated with identical reference numerals.

In FIGS. 2 and 3, the connective tape 8 has a bar code 12 as a discrimination code. The bar code 12 consists of plural lines extending in the width direction of the photo filmstrip 3 and printed with black ink on a white surface of the connective tape 8. The bar code 12 is constituted by black bars with low reflection and white bars with high reflection. There are two widths for both black and white bars, so that there are four kinds of bars in all. In the bar code 12 they are arranged in a predetermined combination, to represent various kinds of information, including photo film type information of the 120 type or the 220 type, and speed information of photo film speed.

Figure 4:
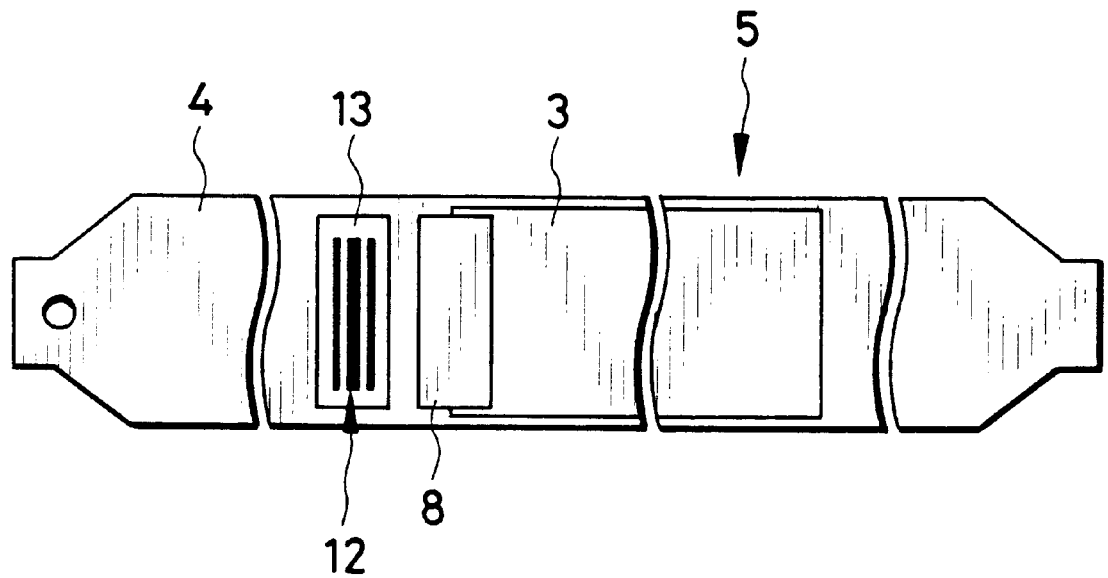
FIG. 4 is a plan illustrating a meduim format photo film having another example of a bar code.
Figure 5:
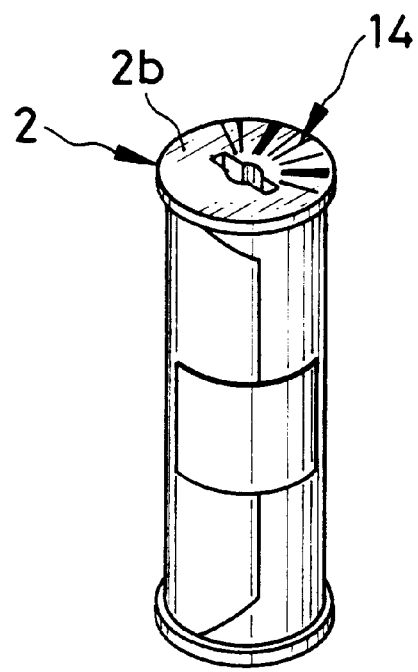
FIG. 5 is a perspective illustrating a meduim format photo film having still another example of a bar code.

In the present embodiment, the bar code 12 is prerecorded on the connective tape 8. Alternatively a tape 13 having the bar code 12 may be attached to the backing paper 4 in a position nearer to the end than the connective tape 8. See FIG. 4. Moreover a bar code may be printed on the backing paper 4 directly. Furthermore a bar code 14 may be printed on the flange 2b of the spool 2 of the roll photo film 1. See FIG. 5. If the bar code 14 on the flange 2b is used, a camera suitable for this requires a photo sensor disposed on an upper or lower surface of the inside of the photo film supply chamber, for reading the bar code 14.

Figure 6:
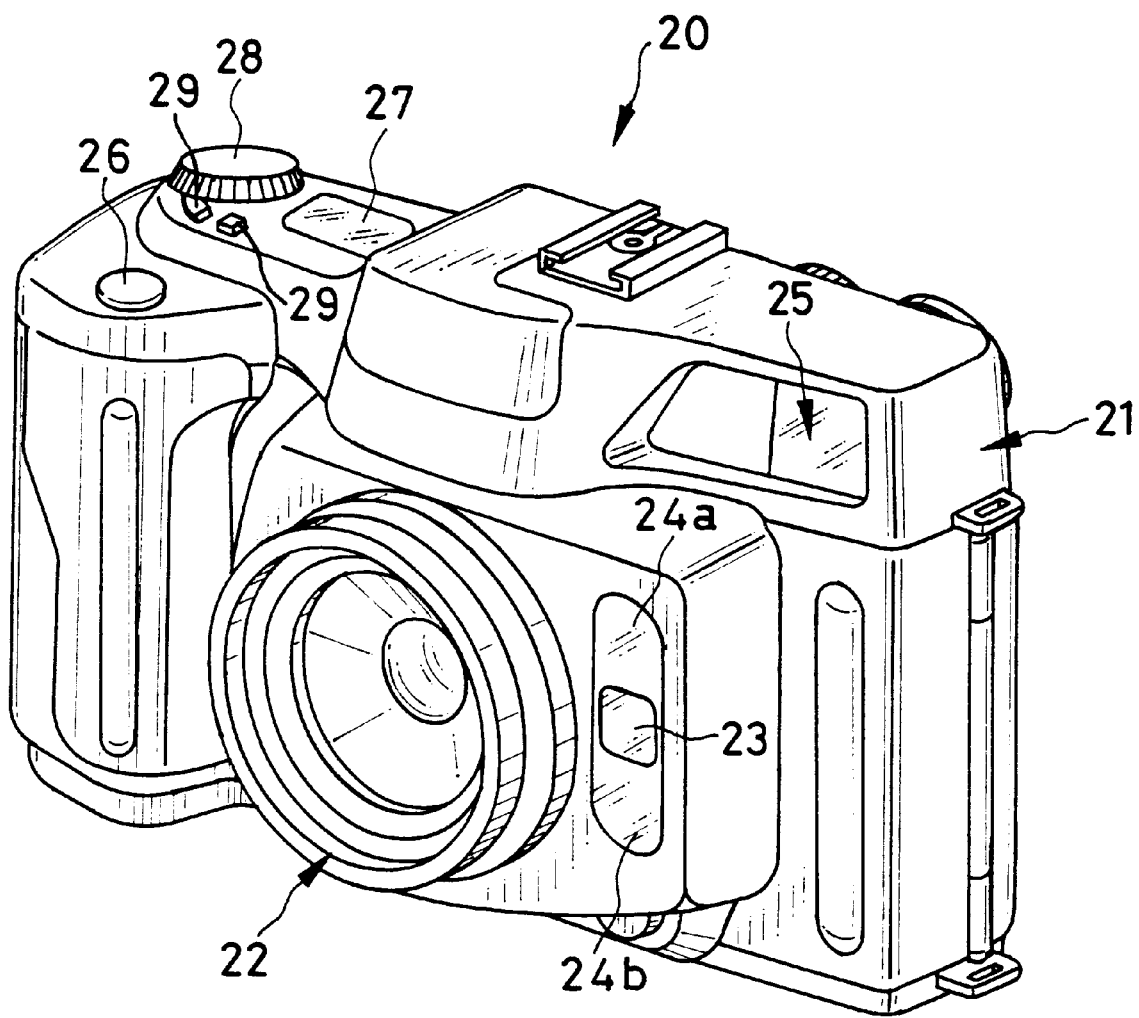
FIG. 6 is a perspective illustrating a meduim format camera.

In FIG. 6, a camera 20 is depicted. A camera body 21 of the camera 20 has a front side on which there are a taking lens 22, a photometric window 23, rangefinding windows 24a and 24b and a viewfinder 25. The photometric window 23 operates for exposure control. The rangefinding windows 24a and 24b are used for autofocussing. On the top of the camera body 21 are disposed a shutter release button 26, an LCD (liquid crystal display) panel 27 as indicator, an adjustor dial 28 of an external input unit, and pushbuttons 29 of the external input unit. The LCD panel 27 indicates various kinds of information required for taking an exposure. The adjustor dial 28 and the pushbuttons 29 are operable for determining various values and adjustment of the rotational position of the take-up spool. Details of them are described later.

The taking lens 22 is focussed to a photographic subject according to its subject distance measured by use of the rangefinding windows 24a and 24b. The shutter release button 26 is depressible to a halfway depressed position and a fully depressed position deeper than the halfway depressed position. When the shutter release button 26 is depressed only to the halfway depressed position, then the camera effects operation of focussing the photographic subject and measuring the subject brightness of the subject. When the shutter release button 26 is depressed only to the fully depressed position, then the shutter mechanism is released to take an exposure. Also the shutter release button 26 is an operable device for operation of initial advancement of the photo filmstrip to set one first frame at the exposure aperture. A release switch 73 is associated with the shutter release button 26. See FIG. 11.

Figure 7:
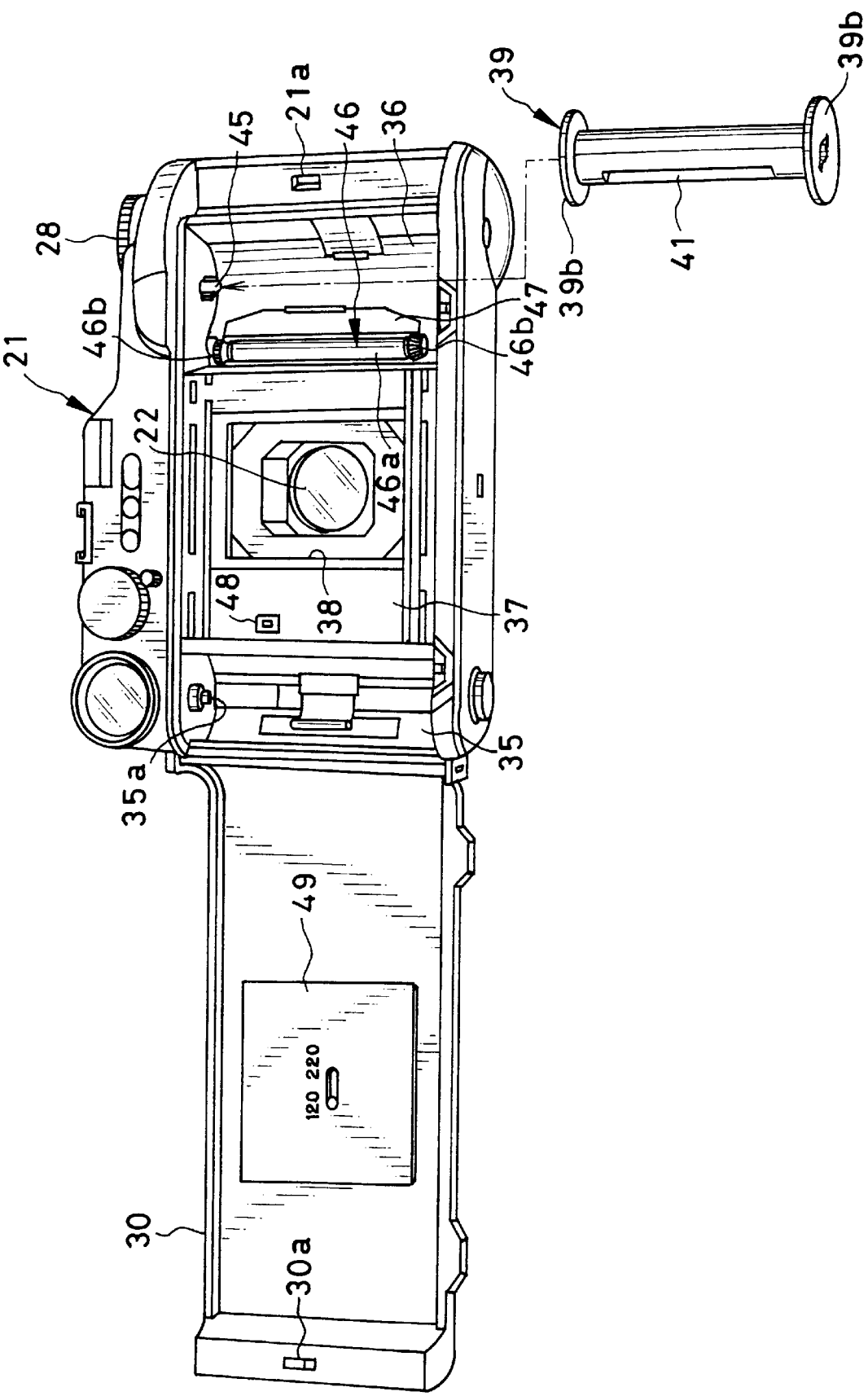
FIG. 7 is a perspective illustrating the camera of which a back lid is open, together with a take-up spool.

In FIG. 7, the rear of the camera body 21 is depicted in a state with an openable back lid 30 kept open. The camera body 21 has a photo film supply chamber 35 and a photo film take-up chamber 36, between which a photo film passageway 37 extends. An exposure aperture 38 is disposed behind the taking lens 22 and positioned in the photo film passageway 37 for defining a frame size of each frame to be formed on the photo filmstrip 3.

The photo film supply chamber 35 is loaded with the roll photo film 1 being unexposed. There is a support shaft 35a disposed to project down from an upper wall of the photo film supply chamber 35. The support shaft 35a is inserted in the shaft insertion hole 7 of the spool 2 and supports the roll photo film 1 in a rotatable manner in the photo film supply chamber 35.

A take-up spool 39 is inserted in the photo film take-up chamber 36. The take-up spool 39 is the spool 2 from which the entirety of the meduim format photo film 5 has been exposed and removed. Since the take-up spool 39 is structurally the same as the spool 2, various partial elements of the take-up spool 39 are the same as those of the spool 2, including a spool core 39a, flanges 39b, a shaft insertion hole 40, an axial hole 40a, key ways 40b, an insertion slit 41, an insertion entrance 41a, and a claw 41b. See FIG. 8.

A drive shaft 45 is disposed to extend down from an upper wall of the photo film take-up chamber 36, and caused to rotate by a transport mechanism, which will be described later. A photo film roller 46 is disposed in the photo film take-up chamber 36 in the vicinity of the photo film passageway 37 for detecting a transported amount of the photo film-strip 3. The photo film roller 46 consists of a shaft 46a and a pair of rubber rolls 46b disposed on axial ends of the shaft 46a. The rubber rolls 46b contact the meduim format photo film 5 and are caused to rotate by movement of the meduim format photo film 5.

A guide mechanism 47 is disposed between the take-up spool 39 and the photo film roller 46 in the photo film take-up chamber 36, for guiding the front end of the meduim format photo film 5, in order to facilitate its insertion into the insertion slit 41 of the take-up spool 39. A reflection type of photo sensor 48 as a code reader is disposed in a wall of the photo film passageway 37 between the exposure aperture 38 and the photo film supply chamber 35, confronted with a path of the bar code 12 of the connective tape 8, for reading the bar code 12 and detecting the photo filmstrip 3. The photo sensor 48 includes a projector and a receiver, the projector projecting an infrared beam to the meduim format photo film 5 in the photo film passageway 37, and the receiver receiving the reflected beam. The photo sensor 48 outputs a photoelectric signal at a signal level according to intensity of the received reflected beam. Note that the infrared beam is used in the photo sensor 48 for the purpose of avoiding fogging the photo filmstrip 3.

The back lid 30 covers the rear of the photo film supply chamber 35, the photo film take-up chamber 36 and the photo film passageway 37 to avoid entry of ambient light to the inside of the camera body 21. A pressure plate 49 is disposed on an inner face of the back lid 30. The pressure plate 49 is slidable between positions for the 220 type and the 120 type. In the 220 type position, a surface of the pressure plate 49 is relatively near to the exposure aperture 38. In the 120 type position, the surface of the pressure plate 49 is farther in the rearward direction from the exposure aperture 38 by a thickness of the backing paper 4. This is for the purpose of avoiding changes in the photo film surface relative to the taking lens 22 due to presence and absence of the backing paper 4 behind the photo filmstrip 3.

When the back lid 30 is closed, a lock claw 30a is inserted in a lock hole 21a in the camera body 21 to lock the back lid 30. A back lid switch 74 as a drive shaft set switch is disposed to generate a signal associated with the open and closed states of the back lid 30. See FIG. 11.

Figure 8:
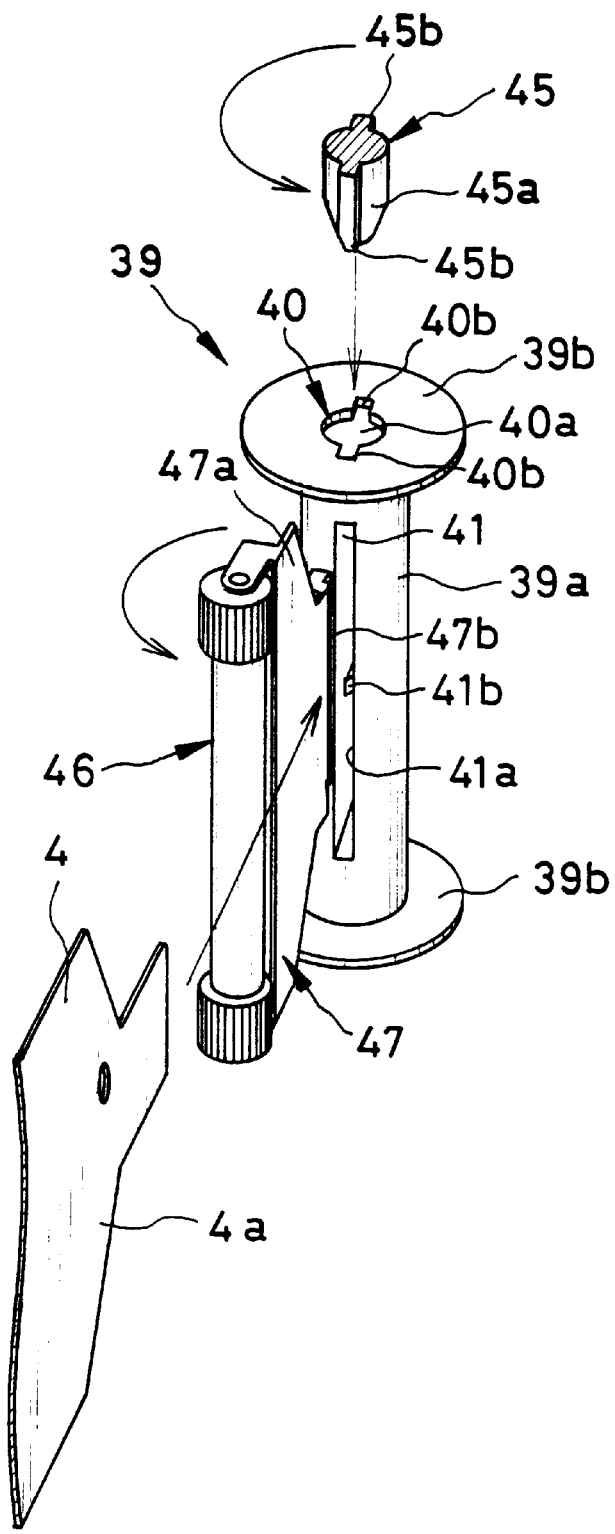
FIG. 8 is a perspective illustrating the take-up spool and mechanisms relevant to it, together with a leader of the meduim format photo film.

The take-up spool 39 is inserted into the photo film take-up chamber 36 with one of the flanges 39b oriented up in the camera 20. In FIG. 8, the drive shaft 45 in the photo film take-up chamber 36 is constituted by a shaft portion 45a and a pair of key portions 45b. The shaft portion 45a has a rod shape, and is insertable in the axial hole 40a of the shaft insertion hole 40. The key portions 45b are formed on the shaft portion 45a, and respectively receivable in the key ways 40b. To mount the take-up spool 39, a direction of the shaft insertion hole 40 is adjusted to set the key ways 40b at the key portions 45b before inserting the drive shaft 45 into the shaft insertion hole 40. Then the drive shaft 45 is engaged with the shaft insertion hole 40, for the take-up spool 39 to rotate with the drive shaft 45 in the winding direction indicated by the arrow in the drawing.

The guide mechanism 47 is constituted by a guide plate 47a and a guide roller 47b. Two projecting portions of the guide plate 47a are supported by ends of the photo film roller 46 to keep the guide plate 47a pivotal thereabout. The guide roller 47b is disposed on an edge of the guide plate 47a. The guide mechanism 47 is pivotal between a guiding position and a retracted position and, when the back lid 30 is open, is pivoted by the bias of a spring (not shown) to the guiding position where the guide roller 47b is nearer to the spool core 39a of the take-up spool 39, and when the back lid 30 is closed, is pivoted to the retracted position away from the spool core 39a.

The guide mechanism 47, having rotated to the retracted position, is biased by the spring to cause the guide roller 47b to push the outer turn of the meduim format photo film 5 about the take-up spool 39. When the turns of the meduim format photo film 5 about the take-up spool 39 increase in the diameter, the guide mechanism 47 is pivoted away from the spool core 39a against the spring. Consequently the meduim format photo film 5 is wound about the take-up spool 39 without looseness.

To load the roll photo film 1, the insertion entrance 41a of the take-up spool 39 is kept near to the guide roller 47b. See FIG. 8. This state of the take-up spool 39 is hereinafter called a "first rotational orientation". The penetrating direction of the insertion slit 41 is set along the guide plate 47a. The leader 4a of the backing paper 4 or the leader sheet 10a is slid in contact with the guide plate 47a, and inserted into the insertion slit 41 through one of the insertion entrances 41a.

The insertion entrances 41a of the take-up spool 39 are disposed in a rotationally symmetrical manner from each other by 180 degrees. When the take-up spool 39 is rotated by 180 degrees from the position where one of the insertion entrances 41a is set near to the guide roller 47b, then another of the insertion entrances 41a becomes set near to the guide roller 47b to resume the first rotational orientation. In short, the first rotational orientation is irrespective of a difference of 180 degrees or half a rotation. Note that a term "second rotational orientation" is used for a rotational orientation of the take-up spool 39 rotated by 90 degrees from the first rotational orientation. Of course the second rotational orientation is irrespective of a difference of 180 degrees or half a rotation.

After the entirety of the meduim format photo film 5 being exposed is wound about the take-up spool 39, the drive shaft 45 is controlled in such a manner that the key portion 45b is stopped in first or third specified rotational position. The first specified rotational position is associated with the first rotational orientation, and is defined where the insertion entrance 41a of the take-up spool 39 is directed to the guide roller 47b which is in the guiding position. The third specified rotational position is defined with a phase difference of 180 degrees or half a rotation of the key portion 45b from the first specified rotational position. Furthermore, each one time that the adjustor dial 28 is operated with the back lid 30 kept open, the drive shaft 45 is caused to make a one fourth rotation. The drive shaft 45 rotates by 90 degrees with reference from an original position of the first or third specified rotational position.

Let a second specified rotational position be a position of the key portion 45b rotated by 90 degrees from the first specified rotational position. Let a fourth specified rotational position be a position of the key portion 45b rotated by 180 degrees from the second specified rotational position. The key portions 45b of the drive shaft 45 are disposed in a rotationally symmetrical positions, namely with a phase difference of 180 degrees. The condition of stopping the key portions 45b in the third specified rotational position is the same as that of stopping the key portions 45b in the first specified rotational position. The condition of stopping the key portions 45b in the fourth specified rotational position is the same as that of stopping the key portions 45b in the second specified rotational position.

Figure 9:
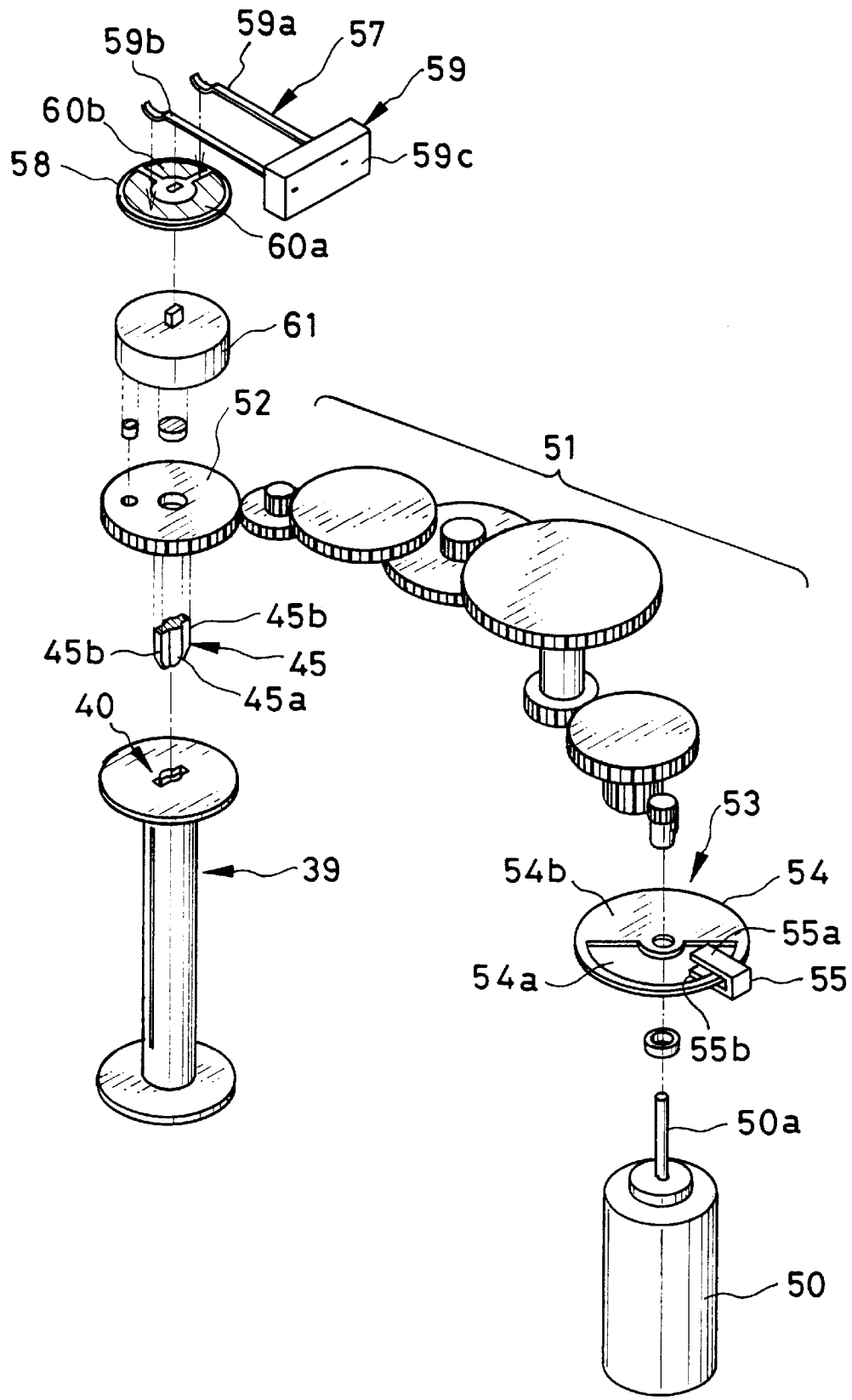
FIG. 9 is an exploded perspective illustrating a motor, a speed reduction gear train, a drive shaft, and a rotation detector switch, all relevant to the transport of the meduim photo film to the take-up spool.

In FIG. 9, a transport mechanism is constituted by a motor 50, a speed reduction gear train 51 and a final gear 52. The final gear 52 is disposed over the photo film takeup chamber 36, and has a bottom face with which the drive shaft 45 is formed integrally. Rotation of a motor shaft 50a of the motor 50 is transmitted to the speed reduction gear train 51. The speed reduction gear train 51 includes plural gears, and transmits rotation of the motor 50 to the final gear 52 so to rotate the final gear 52 at a reduced speed which is lower than that of the motor 50. The drive shaft 45 is rotated at the constant speed, to wind the meduim format photo film 5 about the take-up spool 39.

A motor encoder 53 as a second detector unit is connected to the motor shaft 50a of the motor 50, which rotates at a higher speed than that of the drive shaft 45 on the opposite side of the speed reduction gear train 51. The motor encoder 53 is constituted by a rotatable disk 54 and a photo interrupter 55 as sensor. The disk 54 rotates together with the motor shaft 50a of the motor 50. The photo interrupter 55 includes a beam projector 55a and a beam receiver 55b.

The disk 54 includes a detection opening 54a and a block portion 54b. The detection opening 54a has a sector shape of 180 degrees for allowing the beam receiver 55b to receive a detecting beam from the beam projector 55a. The block portion 54b blocks the detecting beam from the beam projector 55a. The photo interrupter 55 generates a rotation pulse when detecting beam through the detection opening 54a is detected by the beam receiver 55b. Consequently the rotation pulse is output each time that the motor 50 makes one rotation. The rotation pulse is used for finely adjusting the stop position of the key portion 45b of the drive shaft 45. Note that the motor encoder 53 may be constructed differently from the above. For example the motor encoder 53 may be constituted by an encode disk having surfaces of high and low reflection and a photo sensor of a reflection type.

A rotational detector switch 57 as a first detector unit is disposed at the final gear 52, and turned on and off each time that the drive shaft 45 makes a one fourth rotation. The rotational detector switch 57 is constituted by a rotatable disk 58 and a contact unit 59. The disk 58 consists of a base disk having an insulating characteristic and includes a first contact pattern 60a and a second contact pattern 60b both formed on the base disk. The first contact pattern 60a has a sector shape having a central angle of 270 degrees or three right angles. The second contact pattern 60b has a sector shape having a central angle of 90 degrees or one right angle. The second contact pattern 60b is insulated from the first contact pattern 60a. Between the disk 58 and the final gear 52 is disposed a spacer 61, with which the disk 58 is supported on the top face of the final gear 52 in a concentric manner to rotate with the final gear 52. The disk 58 is produced by etching a printed board of a circular shape.

The contact unit 59 is constituted by contact segments 59a and 59b and a support 59c. The contact segments 59a and 59b are electrically conductive and resilient. The support 59c supports the contact segments 59a and 59b with a predetermined gap. Ends of the contact segments 59a and 59b are pressed against a top face of the disk 58 in positions between which the center of the disk 58 lies. When the contact segments 59a and 59b contact the first contact pattern 60a at the same time, the contact segments 59a and 59b are interconnected to turn on the rotational detector switch 57. When either of the contact segments 59a and 59b contacts the second contact pattern 60b, the contact segments 59a and 59b are disconnected from each other, to turn off the rotational detector switch 57.

The rotational detector switch 57 is turned on upon the reach of the key portion 45b to the first and third reference rotational positions, which are respectively short of the first and third specified rotational positions in the winding direction. The rotational detector switch 57 is turned off upon the reach of the key portion 45b to the second and fourth reference rotational positions, which are respectively short of the second and fourth specified rotational positions. Positions of the disk 58 and the contact unit 59 are defined in consideration of those functions.

Figure 10A:
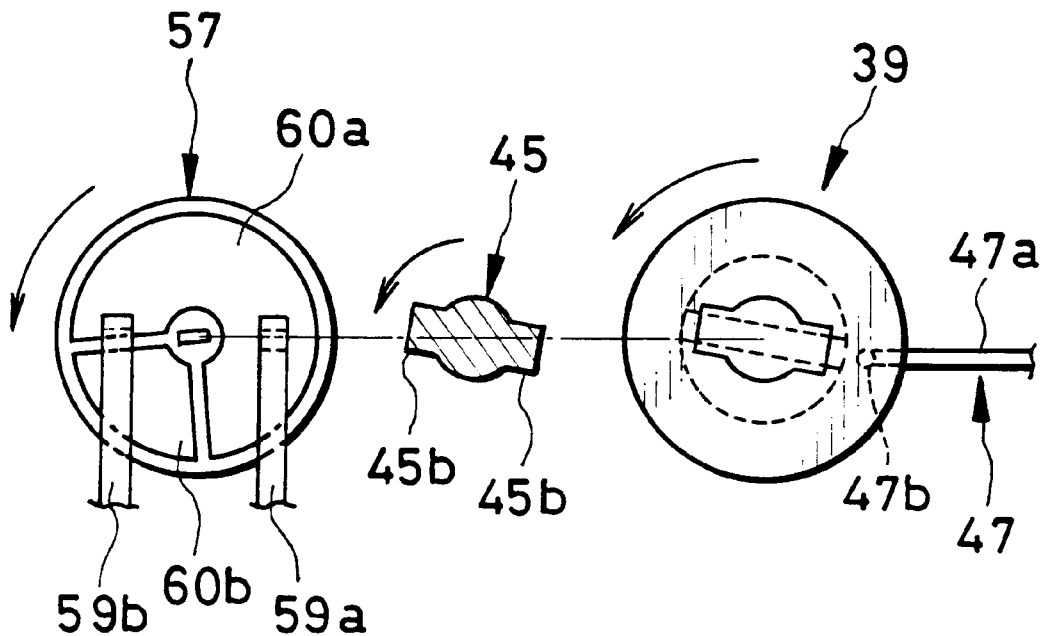

FIGS. 10A, 10B, 10C and 10D illustrate relationships among positions of the rotational detector switch 57, the drive shaft 45, the take-up spool 39 and the guide mechanism 47. In FIG. 10A, the key portion 45b of the drive shaft 45 comes to the first reference rotational position after rotating in the winding direction indicated by the arrow. The contact segments 59a and 59b come in contact with the first contact pattern 60a and are turned on. In other words, the rotational detector switch 57 is turned on in a position short of coming of the take-up spool 39 to the first rotational orientation.

Figure 10B:
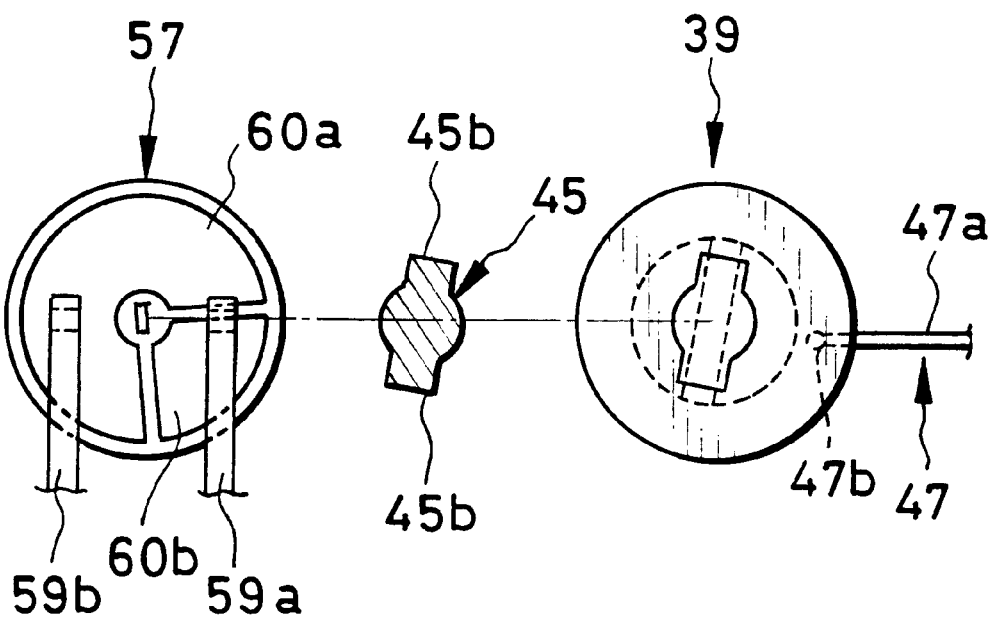
Figure 10C:
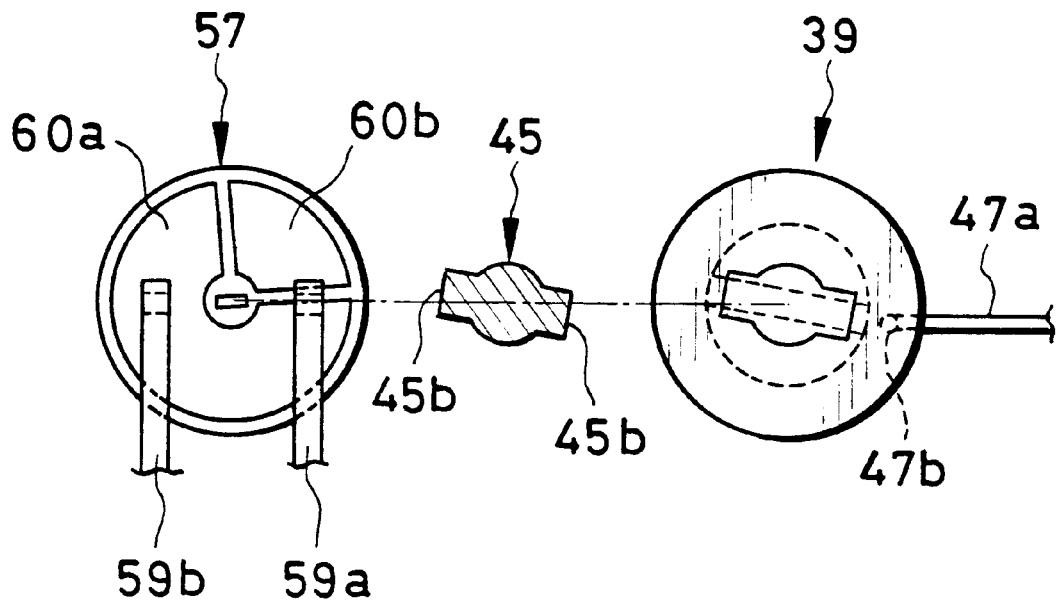
Figure 10D:
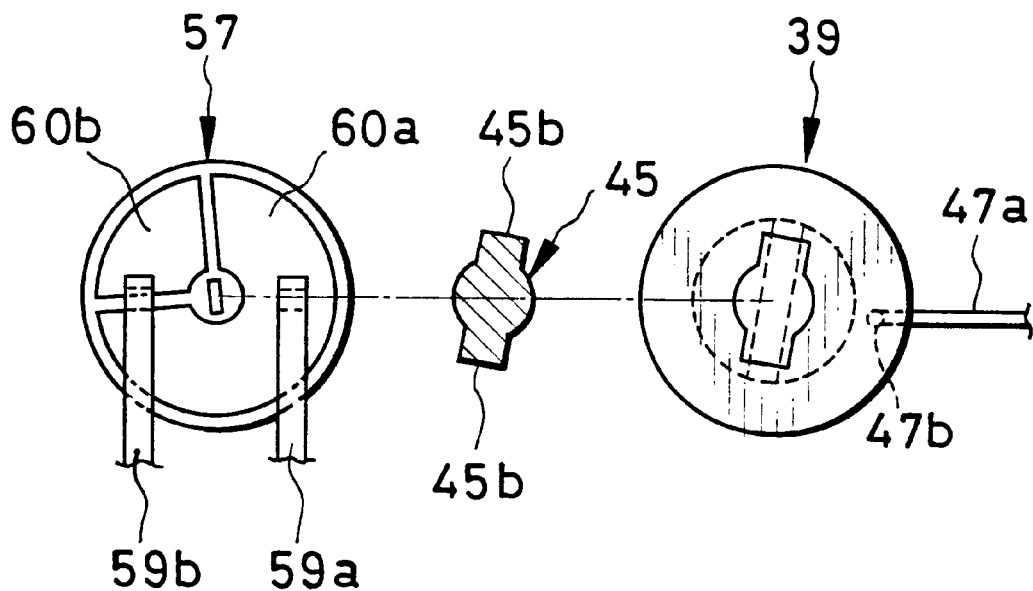

In FIG. 10B, the rotational detector switch 57 is turned off upon the reach of the key portion 45b to the second reference rotational position by the contact of the contact segment 59a with the second contact pattern 60b. In other words, the rotational detector switch 57 is turned off shortly before the take-up spool 39 engaged with the drive shaft 45 comes to have the second rotational orientation. Similarly in FIG. 10C, the rotational detector switch 57 is turned on when the key portion 45b comes to the third reference rotational position. In FIG. 10D, the rotational detector switch 57 is turned off when the key portion 45b comes to the fourth reference rotational position.

The rotational position of the drive shaft 45 is roughly detected by the states of the rotational detector switch 57 turned on and off. Note that it is possible alternatively to use an encoder which may include an encode disk and a photo interrupter or a photo sensor of a reflection type.

Figure 11:
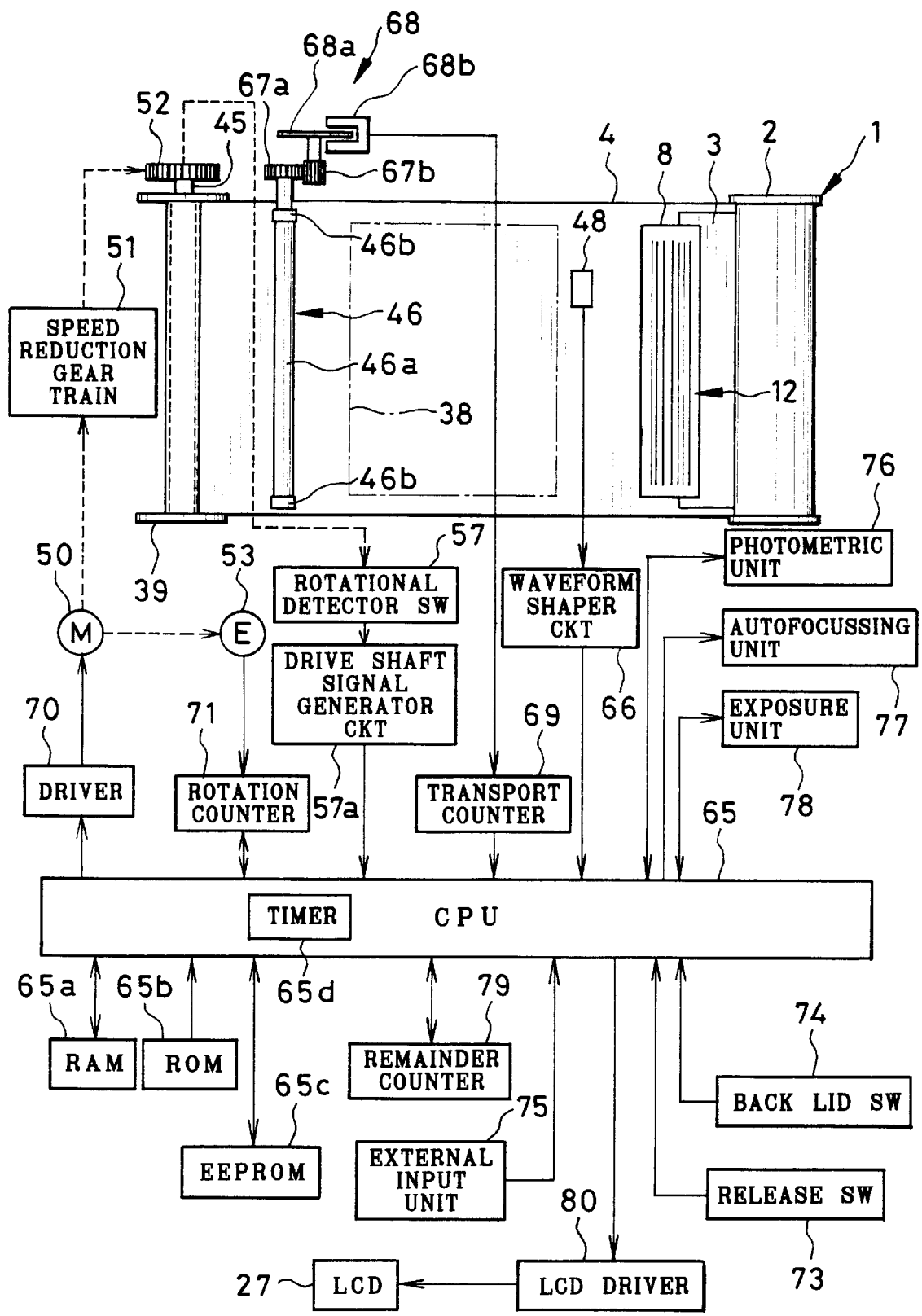
FIG. 11 is an explanatory view or diagram schematically illustrating electric circuits of the camera, together with the meduim format photo film and the take-up spool.

In FIG. 11, CPU 65 in the camera 20 is connected with a RAM 65a, a ROM 65b and an EEPROM 65c and includes a timer 65d. RAM 65a is a work memory for storing various kinds of data required for the control in a temporary manner. ROM 65b stores a program written thereto for the control in various manners. CPU 65 controls relevant components in the camera 20 according to the program, and operates for decoding the bar code 12, controlling the stop position of the drive shaft 45 and the like. EEPROM 65c stores data including photo film type and photo film speed of the roll photo film 1 after decoding the bar code 12. A timer 65d is included in CPU 65 for measuring time.

The photoelectric signal from the photo sensor 48 is sent to a waveform shaper circuit 66. The waveform shaper circuit 66 converts the photoelectric signal to an output at a suitably predetermined threshold level, and outputs a reflection signal of any one of three levels. When the photo sensor 48 detects the backing paper 4 and the black bars of the bar code 12, the reflection signal is at the L (Low) level. When the photo sensor 48 detects the white bars of the bar code 12, the reflection signal is at the H (High) level.

When the photo filmstrip 3 is confronted with the photo sensor 48, then the waveform shaper circuit 66 generates the signal at an "Medium (M) level", which is lower than the High (H) level and higher than the Low (L) level, because an emulsion surface of the photo filmstrip 3 has a reflection factor higher than the backing paper 4 and the black bars and lower than the white bars. The reflection signal is sent to CPU 65 for detection of the photo filmstrip 3 and reading of the bar code 10.

There is a transport encoder 68 as a roller rotation detector connected with the shaft 46a of the photo film roller 46 via gears 67a and 67b. The transport encoder 68 is constituted by a rotatable disk 68a, a photo interrupter 68b and a pulse generator (not shown). Plural slits are formed in the disk 68a and arranged regularly in a radial manner. The disk 68a rotates together with the shaft 46a. The photo interrupter 68b detects passage of each of the slits of the disk 68a. The pulse generator is connected with the photo interrupter 68b, and generates an encode pulse each time that the photo interrupter 68b detect one of the slits. Note that the slits in the disk 68a may be replaced with holes, recesses and the like to be detected by the photo interrupter 68b. The disk 68a may have surfaces of high and low reflection and a photo sensor of a reflection type to generate the encode pulses.

The transport encoder 68 generates one encode pulse each time that the photo film roller 46 rotates by a unit angle, or that the meduim format photo film 5 is transported by a unit length. The encode pulse from the transport encoder 68 is hereinafter referred to as a transport pulse. To be precise, approximately 40 transport pulses are generated when the photo filmstrip 3 is transported by the length of one frame. The transport pulses are sent to a transport counter 69 of the roller rotation detector.

The transport counter 69 is used for measuring a length by which the photo filmstrip 3 is transported, and has a counted number Cs. CPU 65 resets the counted number Cs at zero (0). The transport counter 69 steps up the counted number Cs by one (1) each time that the transport pulse is generated and received. The counted number Cs of the transport counter 69 is sent to CPU 65 for the purpose of controlling the transport of the meduim format photo film 5.

A driver 70 is controlled by CPU 65 and drives the motor 50. The driver 70 adjusts the rotational speed of the motor 50, for example by increasing and decreasing a drive current supplied to the motor 50. Rotation of the motor 50 is transmitted to the final gear 52 via the speed reduction gear train 51. The rotation pulses from the motor encoder 53 in connection with the motor 50 are sent to a rotation counter 71 of the second detector unit. The rotation counter 71 has a counted number Cm, which is reset by CPU 65 at zero (0). Each time that a rotation pulse is generated, the counted number Cm is stepped up by one. By use of the rotation counter 71, CPU 65 measures the width of each bar of the bar code 12, and finely adjusts the stop position of the drive shaft 45.

Note that a roll diameter about the take-up spool 39 increases according to an increase of a length of the meduim format photo film 5 being wound. There is no proportionality in the relationship between the number of the rotation pulses and the transported length of the meduim format photo film 5. However there is only a very small change in the roll diameter while the connective tape 8 is moved past the photo sensor 48. The relationship between the number of the rotation pulses and the transported length of the meduim format photo film 5 can be approximated proportionally. It is possible to utilize the number of the rotation pulses in measuring widths of the bars of the bar code 12.

The photo sensor 48, the waveform shaper circuit 66, the motor encoder 53, the rotation counter 71 and CPU 65 are combined to constitute a reader unit for reading the bar code.

The output of the rotational detector switch 57 turned on and off is sent to a drive shaft signal generator circuit 57a, which converts the output into a drive shaft signal. The drive shaft signal generator circuit 57a, when the rotational detector switch 57 is turned on, outputs the drive shaft signal at the H (High) level, and when the rotational detector switch 57 is turned off, outputs the drive shaft signal at the L (Low) level. The drive shaft signal is sent to CPU 65. Upon the change in the drive shaft signal, CPU 65 detects that the key portion 45b of the drive shaft 45 comes near to any of the first to fourth specified rotational positions. It is to be noted that the change in the drive shaft signal from the H (High) level to the L (Low) level is determined as a first one of two kinds of drive shaft signals. The change in the drive shaft signal from the L (Low) level to the H (High) level is determined as the second one of two kinds of drive shaft signals. Alternatively it is possible to determine that the drive shaft signal of the H (High) level itself is a first one of two kinds of drive shaft signals, and that the drive shaft signal of the L (Low) level itself is the second one of two kinds of drive shaft signals.

During the one-frame transport of the photo filmstrip 3 and during the final winding in which a final or rear portion of the meduim format photo film 5 is entirely wound about the take-up spool 39, CPU 65 evaluates changes in the counted number Cs of the transport counter 69 and changes in a drive shaft signal, to check acceptability in the transport of the photo filmstrip 3.

The release switch 73 is turned on upon depression of the shutter release button 26, generates a halfway depressed signal upon the halfway depression of the shutter release button 26, and generates a full depression signal upon the full depression of the shutter release button 26. The halfway depression signal and the full depression signal are sent to CPU 65. Note that a term "release signal" is used for both of the halfway depression signal and the full depression signal and particularly if the difference between them is irrespective.

The back lid switch 74 is disposed in the lock hole 21a, turned on and off in response to operation to opening and closing of the back lid 30, to output an open/close signal. The open/close signal, when the back lid 30 at open, is at an L (Low) level, and when the back lid 30 is closed, is at an H (High) level. The open/close signal is sent to CPU 65, and used as a detection of the open/closed state of the back lid 30.

An external input unit 75 is constituted by the adjustor dial 28, the pushbuttons 29, an encoder associated with them, various switches and the like, and sends a U/D signal, set signals and other signals to CPU 65.

A photometric unit 76 has a photometric sensor disposed inside the photometric window 23, measures subject brightness, and sends a photometric result of the brightness to CPU 65. CPU 65 calculates the aperture stop and the shutter speed optimized for taking an exposure according to the photometric result and the photosensitivity of the photo film in a programmed manner. An autofocussing (AF) unit 77 includes rangefinding sensors and a motor. The rangefinding sensors are respectively disposed inside the rangefinding windows 24a and 24b. The motor drives the taking lens 22 for the purpose of a focussing operation.

An exposure unit 78 is constituted by aperture stop blades, an aperture stop mechanism, a shutter blade and a shutter mechanism. The aperture stop blades and the shutter blade are incorporated in a space inside the taking lens 22. The aperture stop mechanism and the shutter mechanism respectively includes a motor and circuits, and drive the aperture stop blades and the shutter blade. CPU 65 determines a value of an exposure stop at which the aperture stop mechanism is actuated, and determines a shutter speed at which the shutter mechanism is actuated. Upon the full depression of the shutter release button 26, the shutter mechanism and the aperture stop mechanism are driven in accordance with the exposure stop value and the shutter speed being determined, so that the photo filmstrip 3 is exposed at an optimized exposure. Each time after the shutter mechanism is driven for exposing one frame, the exposure unit 78 sends a finish signal to CPU 65.

A remainder counter 79 counts the number of remaining available frames. For the initial value of a counted number Cf of the remainder counter 79, the number of available frames is set according to the photo film type after reading the bar code 12. Each time after one frame is exposed, the counted number Cf is stepped down. Note that, instead of using the remainder counter 79, it is possible with RAM 65a and EEPROM 65c to count the number of the remaining frames. Instead of using the transport counter 69 and the rotation counter 71, RAM 65a can be used for counting transport pulses and rotation pulses. An LCD driver 80 is controlled by CPU 65 to cause the LCD panel 27 to indicate information, including the aperture stop value, the shutter speed, the number of the available frames, and the photo film type. When an error or accident occurs in the transport of the photo filmstrip 3, the LCD panel 27 displays an indication of ERROR.

Figure 12:
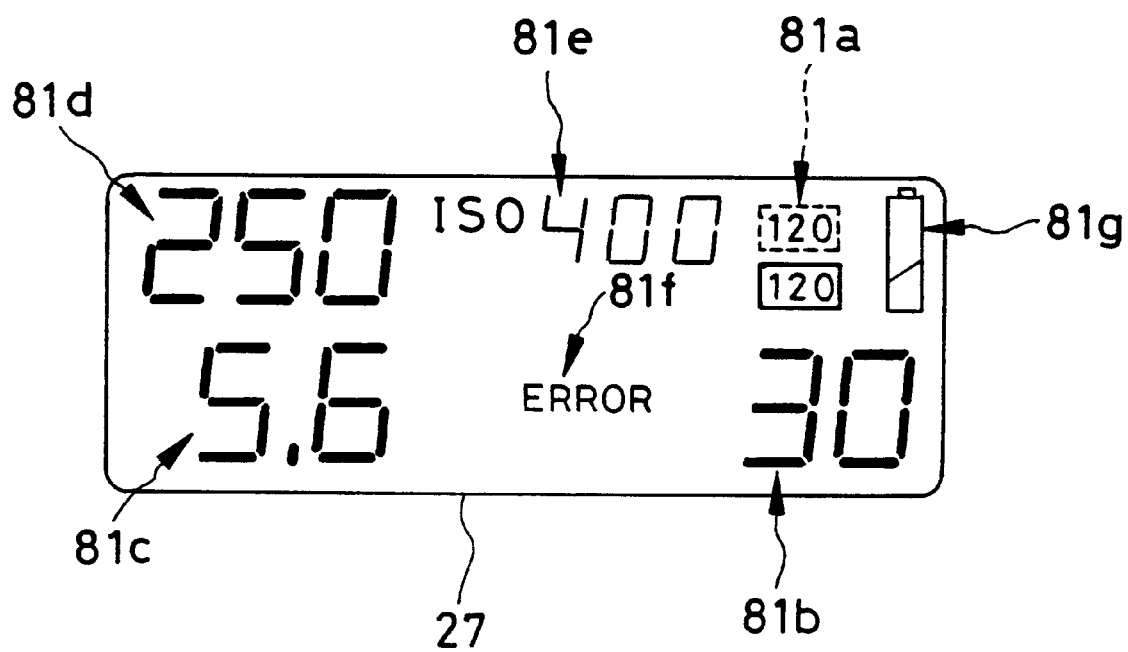
FIG. 12 is a plan illustrating a liquid crystal display panel.
Figure 13:
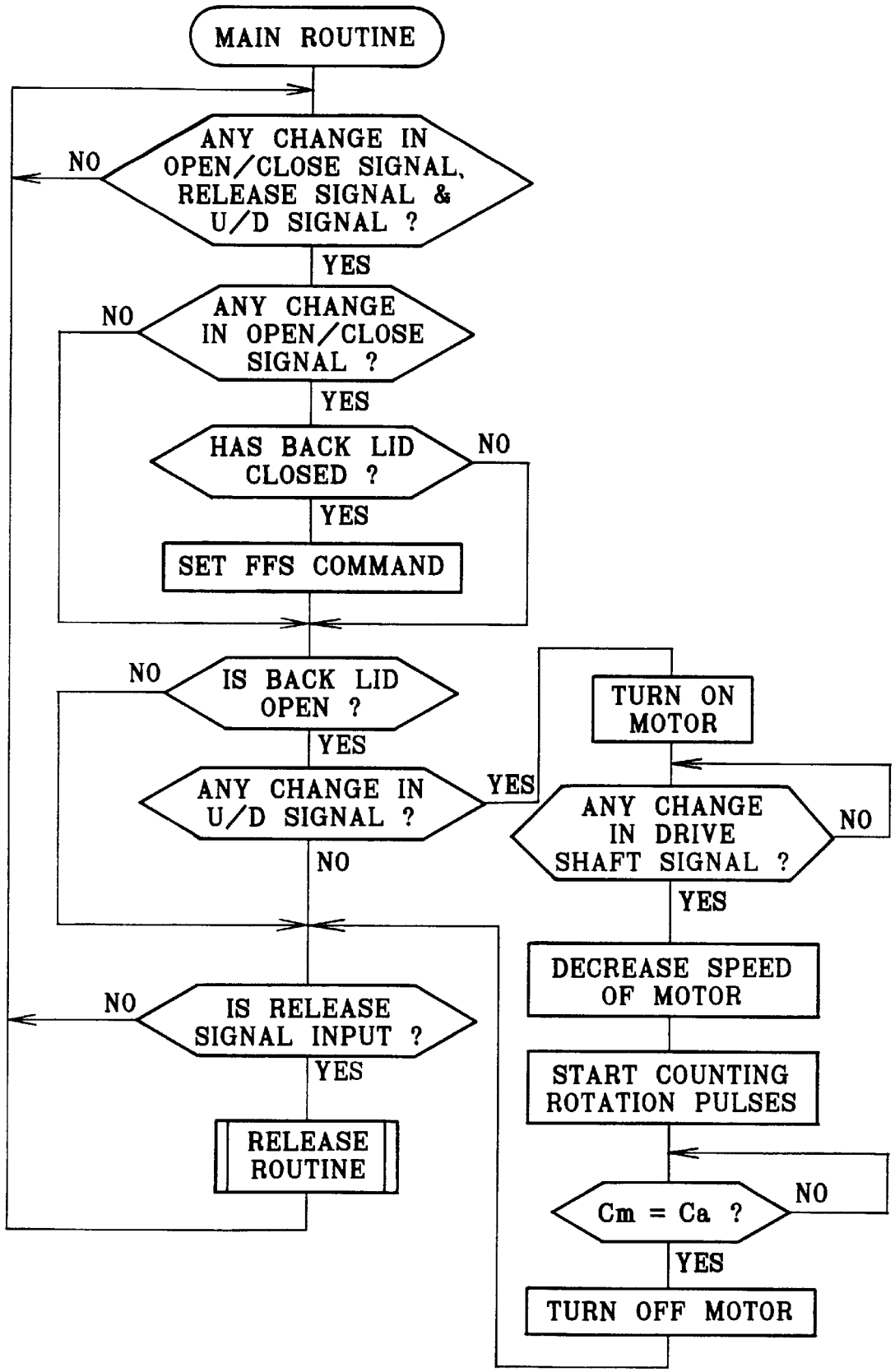
FIG. 13 is a flow chart illustrating a main routine of the operation of the camera.

In FIG. 12, examples of indications on the LCD panel 27 are depicted. The LCD panel 27 includes a photo film type region 81a, a frame number region 81b, an aperture stop region 81c, a shutter speed region 81d, a photo film speed region 81e, an error region 81f and a battery check region 81g. In the photo film type region 81a appears a numeral of 120 or 220 to indicate which of the 120 and 220 types the roll photo film 1 is. The frame number region 81b indicates the number of remaining available frames as a frame counter. The shutter speed region 81c and the photo film speed region 81d indicate the exposure stop value and the shutter speed set in the exposure unit 78. The photo film speed region 81e indicates the photo film speed of the photo filmstrip 3. The error region 81f indicates a message of ERROR in a blinking manner when an error or accident occurs in the transport of the photo filmstrip 3. The battery check region 81g indicates an indicia of the battery in a blinking manner when the remaining amount of energy in the battery has become small.

The operation of the above construction is described now by referring to FIGS. 13–16. To insert the roll photo film 1, a user opens the back lid 30 of the camera body 21, and changes the position of the pressure plate 49 for either of the 120 type and the 220 type according the type of the roll photo film 1 to be inserted. Upon the opening movement of the back lid 30, the guide mechanism 47 is rotated. The guide roller 47b is moved to the guiding position. The open/close signal is changed to the L (Low) level as the back lid 30 is opened.

Then an uncovered spool derived from the roll photo film 1 used previously is loaded in the photo film take-up chamber 36 as the take-up spool 39. Upon the final winding after taking exposures on the previous meduim format photo film, the drive shaft 45 is stopped to orient the key portion 45b in the first or third specified rotational position. The key way 40b is engaged with the key portion 45b, while the take-up spool 39 is loaded into the photo film take-up chamber 36 in the first rotational orientation. After this the user inserts the support shaft 35a of the photo film supply chamber 35 into the shaft insertion hole 7 of the spool 2 of the roll photo film 1, to load the photo film take-up chamber 36 with the roll photo film 1.

In the photo film take-up chamber 36, the take-up spool 39 is inserted while the insertion entrance 41a is kept directed to the guide plate 47a. The user, having peeled the adhesive tape 6 of the roll photo film 1 in the photo film supply chamber 35, unbends the leader 4a of the backing paper 4, and slides the leader 4a along the guide plate 47a toward the spool core 39a of the take-up spool 39. The leader 4a is inserted in the insertion slit 41 through the insertion entrance 41a which is directed to the guide plate 47a, until the hole 4b of the leader 4a is engaged with the claw 41b of the insertion slit 41. The back lid 30 is closed next.

When the adjustor dial 28 is operated with the back lid 30 kept open, the drive shaft 45 is caused to rotate by 90 degrees. CPU 65 constantly executes the main routine of FIG. 13, and monitors whether there is any change in the open/close signal, the release signal and the U/D signal. The U/D signal is generated by the external input unit 75 upon operation the adjustor dial 28. When the U/D signal is input to CPU 65 with the open/close signal generated at the H (High) level, then CPU 65 causes the driver 70 to drive the motor 50. Rotation of the motor 50 is transmitted by the speed reduction gear train 51 to the final gear 52, to rotate the drive shaft 45 in the winding direction. The take-up spool 39 is rotated together.

When the final gear 52 rotates, the disk 58 of the rotational detector switch 57 rotates together. At the start of this rotation of the rotational detector switch 57, both the contact segments 59a and 59b contact the first contact pattern 60a and are turned on, because the key portion 45b is in the first or third specified rotational position. The drive shaft signal generator circuit 57a generates the drive shaft signal of the H (High) level.

The drive shaft 45 further rotates. When the key portion 45b rotates from the first specified rotational position to the second reference rotational position being short of the second specified rotational position, then the contact segment 59a comes in contact with the second contact pattern 60b while the contact segment 59b remains in contact with the first contact pattern 60a. The rotational detector switch 57 is turned off. The drive shaft signal generator circuit 57a changes the drive shaft signal to the L (Low) level. Upon this change, CPU 65 resets the counted number Cm at zero (0), before the rotation counter 71 is caused to start counting rotation pulses.

The motor encoder 53 has the disk 54 which rotates together with the motor 50. Each time that the motor 50 makes one rotation, the motor encoder 53 generates one rotation pulse, and the counted number Cm is stepped incrementally by one. The counted number Cm is proportional to a rotational angle of the drive shaft 45 from the point where the rotational detector switch 57 is turned off. The rotational angle of the drive shaft 45 is measured by counting the number of rotations of the high-speed rotary member included in the speed reduction gear train 51. Accordingly the rotational angle of the drive shaft 45 can be measured with high precision by use of the counted number Cm.

After the rotation counter 71 is caused to start operation, CPU 65 monitors the counted number Cm of the rotation counter 71, and decreases a value of electric current supplied by the driver 70 to the motor 50. The motor 50 is caused to rotate at a decreased speed. The drive shaft 45 and the take-up spool 39 are rotated at a lower speed.

CPU 65 intercepts the current supplied by the driver 70 for the motor 50 when the counted number Cm comes up to the value Ca as a predetermined rotating amount, which is associated with a rotational angle required for the key portion 45b to come to the second specified rotational position from the point of turning off of the rotational detector switch 57. The motor 50 is stopped. Also the drive shaft 45 and the take-up spool 39 are stopped. Shortly before the stop, the drive shaft 45 and the take-up spool 39 have been rotated at a decreased speed. Upon the interception of the current for the motor 50, the drive shaft 45 does not rotate further, as no inertia of the take-up spool 39 affects to the drive shaft 45. The key portion 45b can be stopped in the second specified rotational position. As a result the take-up spool 39 is stopped in the second rotational orientation which corresponds to the second specified rotational position of the key portion 45b.

After the key portion 45b is stopped in the second specified rotational position, the adjustor dial 28 is operated again. The motor 50 is driven to rotate the drive shaft 45 and the take-up spool 39 in the winding direction. Shortly before the key portion 45b comes to the third specified rotational position, the rotational detector switch 57 becomes turned on. The drive shaft signal changes from the L (Low) level to the H (High) level. Upon this change, CPU 65 resets the counted number Cm at zero (0), before the rotation counter 71 is caused to start counting rotation pulses. A rotational angle of the drive shaft 45 is measured. The motor 50 is rotated at a decreased speed. As soon as the counted number Cm becomes the value Ca, the motor 50 is stopped.

The drive shaft 45 stops rotating to set the key portion 45b in the third specified rotational position. The take-up spool 39 comes to have the first rotational orientation. Then the adjustor dial 28 is operated, to cause the key portion 45b to rotate from the third specified rotational position to the fourth specified rotational position. Now the take-up spool 39 has the second rotational orientation. Again the adjustor dial 28 is operated, to cause the key portion 45b to rotate from the fourth specified rotational position to the first specified rotational position. Now the take-up spool 39 has the first rotational orientation. Detailed reasons for rotatability of the take-up spool 39 are described later.

In the above-described manners, the back lid 30 is closed after inserting the leader 4a of the backing paper 4 into the insertion slit 41. The open/close signal from the back lid switch 74 changes from the L (Low) level to the H (High) level. Upon this change CPU 65 sets the FFS command into an internal register for the purpose of first frame setting. After the back lid 30 is closed, a user of the camera depresses the shutter release button 26 either to the halfway depressed position or the fully depressed position. The release signal is generated by the release switch 73 and sent to CPU 65. In response to this CPU 65 executes the release routine.

Figure 14:
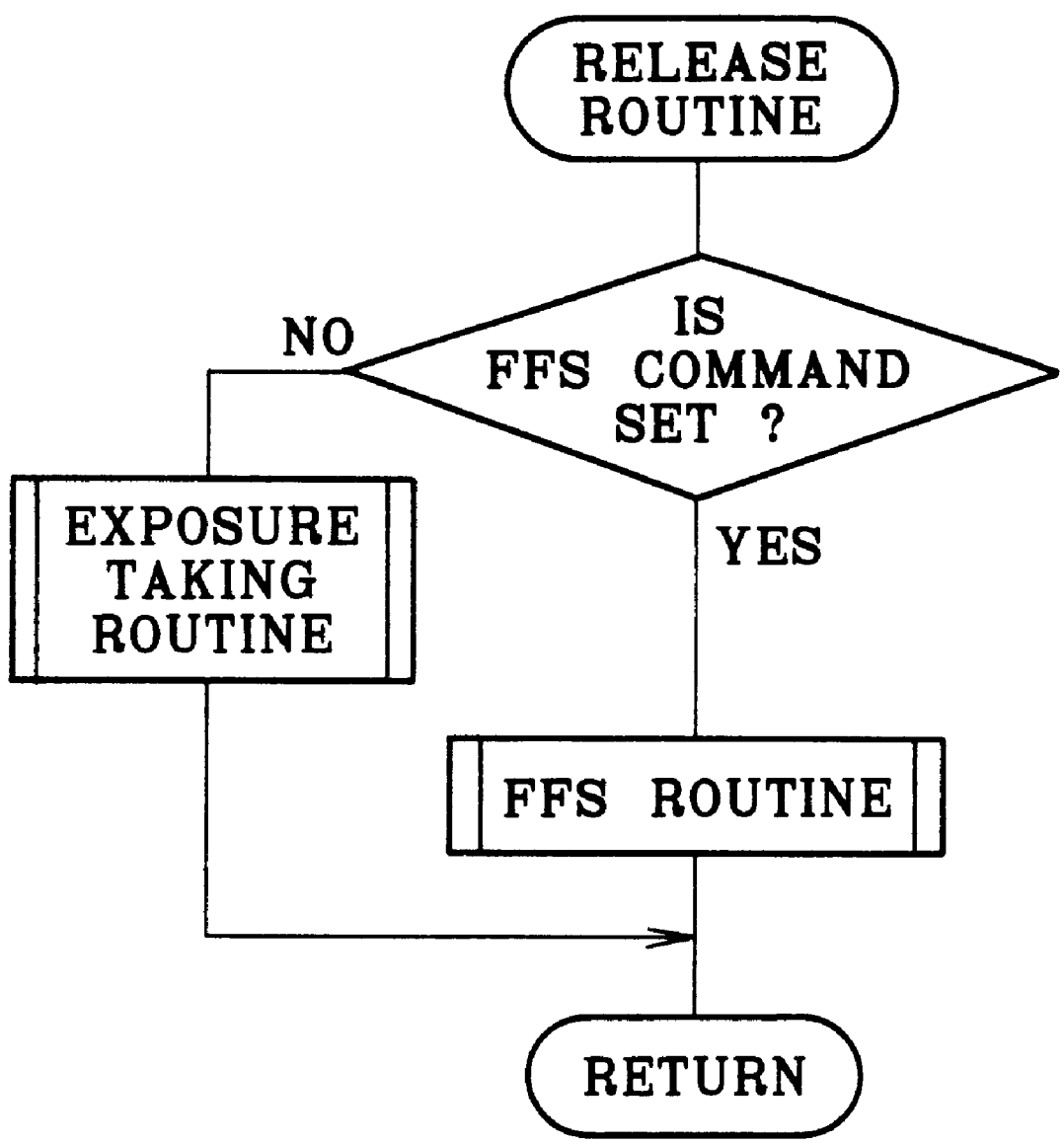
FIG. 14 is a flow chart illustrating a release routine of the camera.
Figure 15:
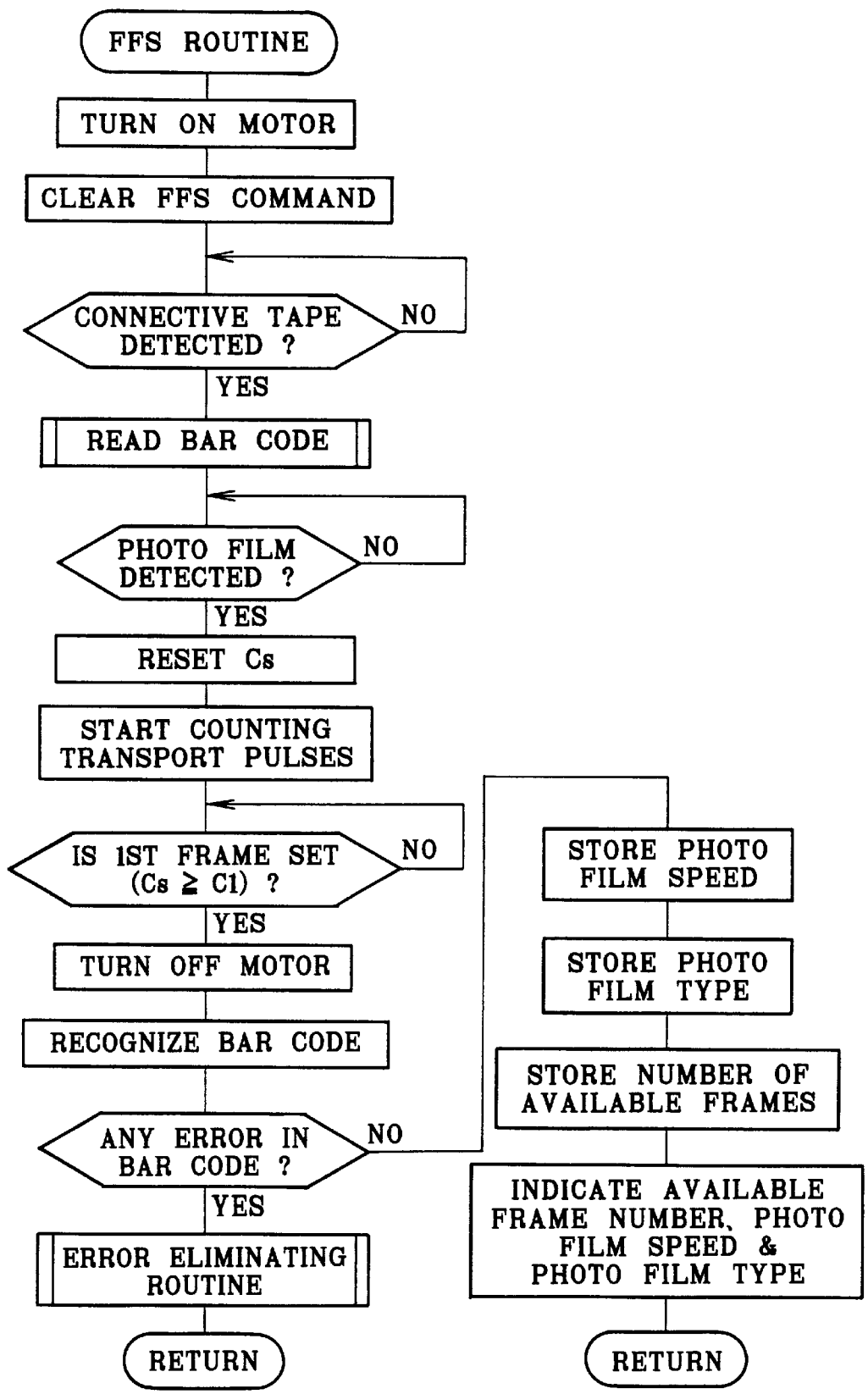
FIG. 15 is a flow chart illustrating a routine of the first frame setting.

In the release routine of FIG. 14, it is checked whether the FFS command is set in the internal register. As is described above, the closing operation of the back lid 30 has set the FFS command. Responsively CPU 65 executes the FFS routine of FIG. 15 instead of executing the exposure taking routine. Note that the FFS routine may start being executed immediately after closing the back lid 30 without considering the input of the release signal.

In the FFS routine the motor 50 is turned on at first. Then the FFS command in the internal register is cleared for the purpose of enabling the exposure taking routine upon next depression of the shutter release button 26. Rotation of the motor 50 causes the drive shaft 45 to rotate the take-up spool 39 in the winding direction. The backing paper 4 of the meduim format photo film 5 is wound about the take-up spool 39. The backing paper 4 of the roll photo film 1 in the supply chamber 35 is transported toward the take-up spool 39 through the photo film passageway 37.

After starting the transport of the meduim format photo film 5 in the above-described manner, CPU 65 starts detection of the connective tape 8 by use of the photo sensor 48. When the connective tape 8 reaches the photo sensor 48 in the course of the transport of the backing paper 4, a front edge of the bar code 12 or a front blank portion of the connective tape 8 becomes confronted with the photo sensor 48. Then the reflection signal from the waveform shaper circuit 66 changes from the L (Low) level to the H (High) level. Upon this change of the reflection signal, CPU 65 detects the existence of the connective tape 8, and starts measuring the widths of the bars of the bar code 12 in the bar code reading routine.

To measure the widths of the bars, at first CPU 65 starts the rotation counter 71 upon the change of the reflection signal to the H (High) level. Each one rotation of the motor 50 steps up the counted number Cm by one. Upon next change of the reflection signal from the H (High) level to the L (Low) level, CPU 65 resets the counted number Cm at zero (0), to continue counting the rotation pulse. Upon next change of the reflection signal from the L (Low) level to the H (High) level, CPU 65 reads the counted number Cm, and then resets the counted number Cm at zero (0), to restart counting the rotation pulse. The read value of the counted number Cm is written to RAM 65a as first width data.

When the reflection signal changes from the H (High) level to the L (Low) level, CPU 65 reads the counted number Cm, and then resets the counted number Cm at zero (0), to restart counting the rotation pulse. The read value of the counted number Cm is written to RAM 65a as second width data. Similarly upon each change of the reflection signal from the H (High) level to the L (Low) level or from the L (Low) level to the H (High) level, the counted number Cm is read out to write the succeeding width data including the third width data to RAM 65a.

The rear edge of the connective tape 8 is moved past the photo sensor 48. The photo filmstrip 3 becomes confronted with the photo sensor 48 to change the reflection signal to the M (Medium) level, so that the measurement of the bar widths is finished. The counted number Cm at the time of the change of the reflection signal to the M (Medium) level is not written to RAM 65a. In the manner described above, the numbers of the rotation pulses associated with the widths of the bars are written to RAM 65a on the basis of the movement of the bar code 12 past the photo sensor 48.

When the reflection signal of the M (Medium) level is generated, CPU 65 detects existence of the photo filmstrip 3 at the photo sensor 48. Afterwards the meduim format photo film 5 is transported by a regular length. The counted number Cs is reset at zero (0) for the purpose of setting a portion of the photo filmstrip 3 for a first frame behind the exposure aperture 38. Then the transport counter 69 starts operation.

The photo film roller 46 is rotated by the transport of the meduim format photo film 5. Each time that the photo filmstrip 3 is transported by a unit length, a transport pulse of generated, to step the counted number Cs of the transport counter 69 incrementally by one.

CPU 65 monitors the counted number Cs of the transport counter 69. When the counted number Cs comes up to the predetermined value C1, the motor 50 is stopped to stop transporting the meduim format photo film 5. The value C1 is the number of the transport pulses generated in the period beginning when the photo filmstrip 3 becomes confronted with the photo sensor 48 and ending when the front end of the photo filmstrip 3 reaches an exposure position at the exposure aperture 38. The value C1 is predetermined in the course of the manufacture. Consequently the portion of the photo filmstrip 3 for the first frame is set behind the exposure aperture 38.

After the motor 50 is stopped, CPU 65 evaluates all the sets of the width data stored in RAM 65a, and checks which of a wide bar and a narrow bar is represented by each set of the width data. The photo film type and the photo film speed of the roll photo film 1 are detected on the basis of the bar arrangement of the bar code 12 being recognized.

After CPU 65 decodes the bar code in an appropriate manner, it writes the decoded photo film speed and photo film type to RAM 65a. Also CPU 65 determines the number of available frames by use of the photo film type being detected, and writes the number to RAM 65a. The available frame number is set in the remainder counter 79 as an initial value. Then the first frame setting is finished to stand by for exposing the first frame.

If there is failure in correctly reading the bar code, CPU 65 causes the LCD panel 27 to inform the user by indicating ERROR in a blinking manner in the error region 81f. The user observes the indication, and solves the problem, for example by replacing the roll photo film 1 with a new one. Then the first frame setting is effected in the same manner as above. It is to be noted that the camera can be constructed with the adjustor dial 28 operable for inputting photo film speed, a photo film type and the number of the available frames.

The shutter release button 26 is depressed in the state of standby for the first frame. When the shutter release button 26 is depressed halfway, the photometric unit 76 and the autofocussing unit 77 are operated. When the shutter release button 26 is depressed fully, the exposure unit 78 is operated to take an exposure on the first frame of the photo filmstrip 3. If the shutter release button 26 stops being depressed only upon the halfway depression, the state standby for the first frame is recovered.

After the first frame is exposed, an exposure finish signal is generated and sent to CPU 65. In response to this CPU 65 effects the transport routine of FIG. 16. At first CPU 65 resets the counted number Cs at zero (0) and then starts operating the transport counter 69. The motor 50 is turned on to start winding the photo filmstrip 3 about the take-up spool 39.

CPU 65 checks whether the counted number Cf of the remainder counter 79 is one (1) to judge whether all frames have been exposed. If the counted number Cf is one (1), the final winding is effected. Of course the counted number Cf is not one (1) immediately after taking the first exposure. CPU 65 effects the one-frame transport, because all the frames have not been exposed.

In the one-frame transport, CPU 65 monitors the counted number Cs of the transport counter 69 stepped up each time that the photo filmstrip 3 is transported by the unit length. When the counted number Cs comes up to Cs=C2, it is confirmed that the photo sensor 48 detects existence of the photo filmstrip 3. Then the motor 50 is stopped. The number C2 is predetermined equal to or slightly greater than the number of transport pulses associated with a length of one frame of the photo film. Therefore a portion of the photo filmstrip 3 as much as one frame is wound about the take-up spool 39. Another portion of the photo filmstrip 3 is set behind the exposure aperture 38 as a second frame.

In the course of the one-frame transport, an accident is likely to occur in which the meduim format photo film 5 to be wound about the spool core 39a of the take-up spool 39 is partially entangled on the periphery of the flanges 39b. The photo filmstrip 3 fails to be transported due to block of rotation of the take-up spool 39 or breakage of the photo filmstrip 3.

During the one-frame transport, CPU 65 is checking normality in the transport of the photo filmstrip 3. When the photo filmstrip 3 stops, the photo film roller 46 stops rotating so that the counted number Cs does not change. If the counted number Cs of the transport counter 69 is stable even at a lapse of a predetermined duration of time before finishing the one-frame transport, CPU 65 judges that there is an accident or failure in the transport of the photo filmstrip 3. The motor 50 is stopped. The LCD driver 80 is caused to drive the LCD panel 27 to indicate ERROR in the error region 81f in the blinking manner, for the purpose of informing the user of the accidental state. Accordingly the user is enabled to eliminate the failure in the transport of the photo filmstrip 3.

After the one frame is transported properly, CPU 65 steps the counted number Cf of the remainder counter 79 decrementally by one after the stop of the motor 50. The transport routine is finished, to stand by for an exposure to a second frame.

In the standby state for the second frame, the shutter release button 26 is depressed to take the second exposure. After this it is checked whether all the frames have been exposed in the same manner as above. Then the meduim format photo film 5 is transported by one frame. Then the one-frame transport is similarly effected each time after one exposure is taken.

After exposing the final frame, CPU 65 causes the transport counter 69 to operate in the same manner as the one-frame transport, and drives the motor 50 to wind the photo filmstrip 3. As the counted number Cf is one (1), the photo film is wound finally in the final winding operation. Unless the counted number Cf is one (1), the final winding is effected when there is no reflection signal of the M (Medium) level, namely the photo sensor 48 does not detect the photo filmstrip 3 after the one-frame transport.

In the final winding, at first CPU 65 monitors the counted number Cs. When generation of the transport pulse is stopped, namely when the trailer sheet 10b or the rear end of the backing paper 4 is moved past the photo film roller 46, then the timer 65d is started in CPU 65, to start measuring time upon the stop of the transport pulse. Also CPU 65 monitors the drive shaft signal, and checks whether the drive shaft signal becomes stable during the lapse of the time Ta.

Immediately after the movement of the rear end of the backing paper 4 past the photo film roller 46, the take-up spool 39 is likely to have an accidentally increased diameter of the turns of the meduim format photo film 5 and stops rotation due to looseness of the turns about the take-up spool 39. At the same time as or immediately after the stop of the transport pulses, the disk 58 stops rotating because the disk 58 is connected to the take-up spool 39 via the drive shaft 45 and the final gear 52. The drive shaft signal becomes stable.

In conclusion, CPU 65 estimates occurrence of failure in the final winding if the drive shaft signal stops changing within the time Ta elapsing after the stop of the transport pulse. The error region 81f is caused to display in the blinking manner to inform the user of the failure.

If the take-up spool 39 stops rotation before the rear end of the backing paper 4 moves past the photo film roller 46, the take-up spool 39 stops at the same time as the photo film roller 46. Then occurrence of an accident or error is estimated in the final winding. Again the ERROR indication appears in the error region 81f in a blinking manner.

The failure in the winding is detected. If the photo film roller 46 stops due to failure immediately after the movement of the meduim format photo film 5 past the photo sensor 48 in the photo film passageway 37, it is possible to detect the failure in the winding. It is possible to avoid an accident of opening the back lid 30 with inadequacy in winding the rear end of the backing paper 4 about the take-up spool 39, so that the photo filmstrip 3 after taking exposures can be prevented from being fogged by ambient light.

In contrast, if the backing paper 4 including the trailer 4c is entirely wound about the take-up spool 39 without an accidental increase of turns thereabout, the take-up spool 39 continues rotating during rotation of the motor 50 even after the trailer 4c moves past the photo film roller 46. The disk 58 continues rotating, so that the drive shaft signal consecutively changes during the time Ta without becoming stable. CPU 65 judges that the final winding is properly effected in accordance with the consecutive changes in the drive shaft signal during the time Ta.

The time Ta is predetermined two (2) seconds, which is sufficient for winding the backing paper 4 including its rear end about the take-up spool 39 after the rear end moves past the photo film roller 46. CPU 65 estimates normality of the final winding and also the finish of the final winding.

The finish of the final winding having been detected, CPU 65 monitors the drive shaft signal. When the drive shaft signal changes from the L (Low) level to the H (High) level, or when the key portion 45b comes to the first or third reference rotational position, then CPU 65 changes over the motor 50 to a decreased speed. Also CPU 65 resets the counted number Cm to zero (0), before starting the rotation counter 71 to count rotation pulse.

Afterwards CPU 65 monitors the counted number Cm, and stops the motor 50 when it increases to become Cm=Ca. The drive shaft 45 is stopped with the key portion 45b oriented in the first or third specified rotational position. Of course the take-up spool 39 is stopped after decrease of the rotational speed, and prevented from being influenced by inertia in the rotation.

After the stop of the motor 50, the user unlocks and opens the back lid 30, and removes the take-up spool 39 from the take-up chamber 36 with the meduim format photo film 5 wound thereabout after being exposed. Subsequently a new photo roll film 1 is loaded and used for taking exposures. For this operation, the spool 2 which is removed from the supply chamber 35 after removal of the entirety of the meduim format photo film 5 is inserted in the take-up chamber 36 by way of the take-up spool 39 being new. At the end of the final winding of the previous operation, the drive shaft 45 is stopped to orient the key portion 45b in the first or third specified rotational position. It is possible readily to insert the leader 4a of the backing paper 4 of the roll photo film 1 into the shaft insertion hole 40 by means of the guide mechanism 47.

Figure 17A:
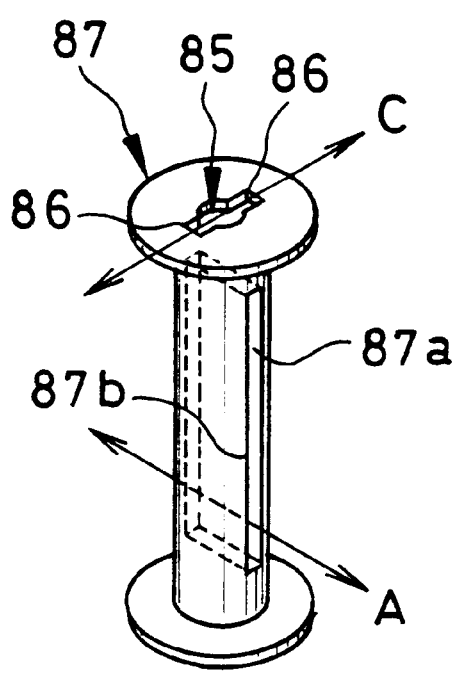
FIG. 17A is a perspective illustrating another preferred spool to be used as a take-up spool.

When only the spool 2 as described above is used, the drive shaft 45 is stopped in the either first or third specified rotational position. However there is another take-up spool 87 as depicted in FIG. 17A. The take-up spool 87 has a shaft insertion hole 85 and an insertion slit 87a. A direction C of cutting key ways 86 of the shaft insertion hole 85 is crosswise to a direction A of penetration of the insertion slit 87a. The take-up spool 87 derives from a variant spool of the roll photo film available in the market.

Figure 17B:
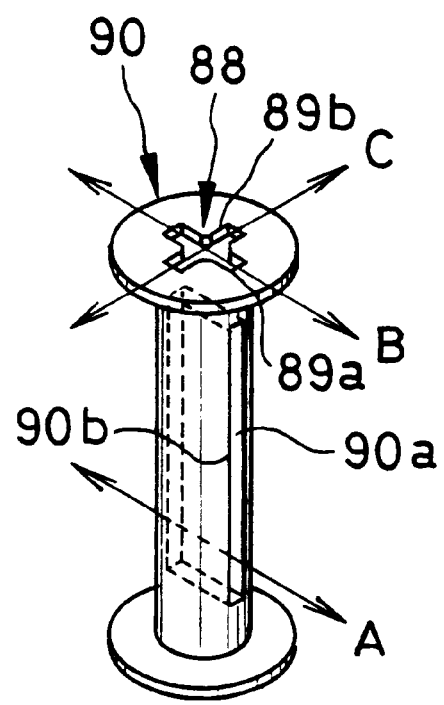
FIG. 17B is a perspective illustrating still another preferred spool.

In FIG. 17B, there is still another take-up spool 90, in which a shaft insertion hole 88 has a crossed shape. Key ways 89a and 89b are cut and oriented in a direction B and a direction C vertical thereto. The direction B of cutting of the key way 89a is determined equal to the direction A of penetration of an insertion slit 90a. Naturally the direction C of cutting of the key way 89b is determined perpendicular to the direction A of penetration of the insertion slit 90a, in a manner similar to the take-up spool 87 of FIG. 17A. Of course the take-up spool 90 derives from a variant roll photo film available in the market.

If the take-up spool 87 of FIG. 17A is used and engaged with the drive shaft 45 with the key portion 45b oriented in the first or third specified rotational position, an insertion entrance 87b of the insertion slit 87a has the second rotational orientation, which is located with a phase difference of 90 degrees from the direction of the guide plate 47a. Accordingly the adjustor dial 28 is manually operated one time to rotate the drive shaft 45 by 90 degrees, to change the key portion 45b from the first specified rotational position to the second specified rotational position. The take-up spool 87 comes to have the first rotational orientation where the insertion entrance 87b is stopped near to the guide plate 47a. The leader 4a of the backing paper 4, therefore, can be inserted into the insertion entrance 87b by the guide mechanism 47.

If the take-up spool 90 of FIG. 17B is used, the key portion 45b is engaged with the key way 89a having the direction B. The take-up spool 90 is loaded in the photo film take-up chamber in the first rotational orientation in the same manner as the spool 2. Therefore the guide mechanism 47 can be used to insert the leader 4a in an insertion entrance 90b. Alternatively the key way 89b may be used for engagement. The key portion 45b is engaged with the key way 89b having the direction C. The adjustor dial 28 is externally operated one time to set the key way 86 in the first rotational orientation. The guide mechanism 47 can be used to insert the leader 4a in the insertion entrance 90b.

This being so, the drive shaft 45 is rotated by 90 degrees and stopped. The leader 4a of the backing paper 4 can be easily inserted in the insertion slit of any of the three types of take-up spool, or types of the spool 2, 87 and 90.

Figure 18:
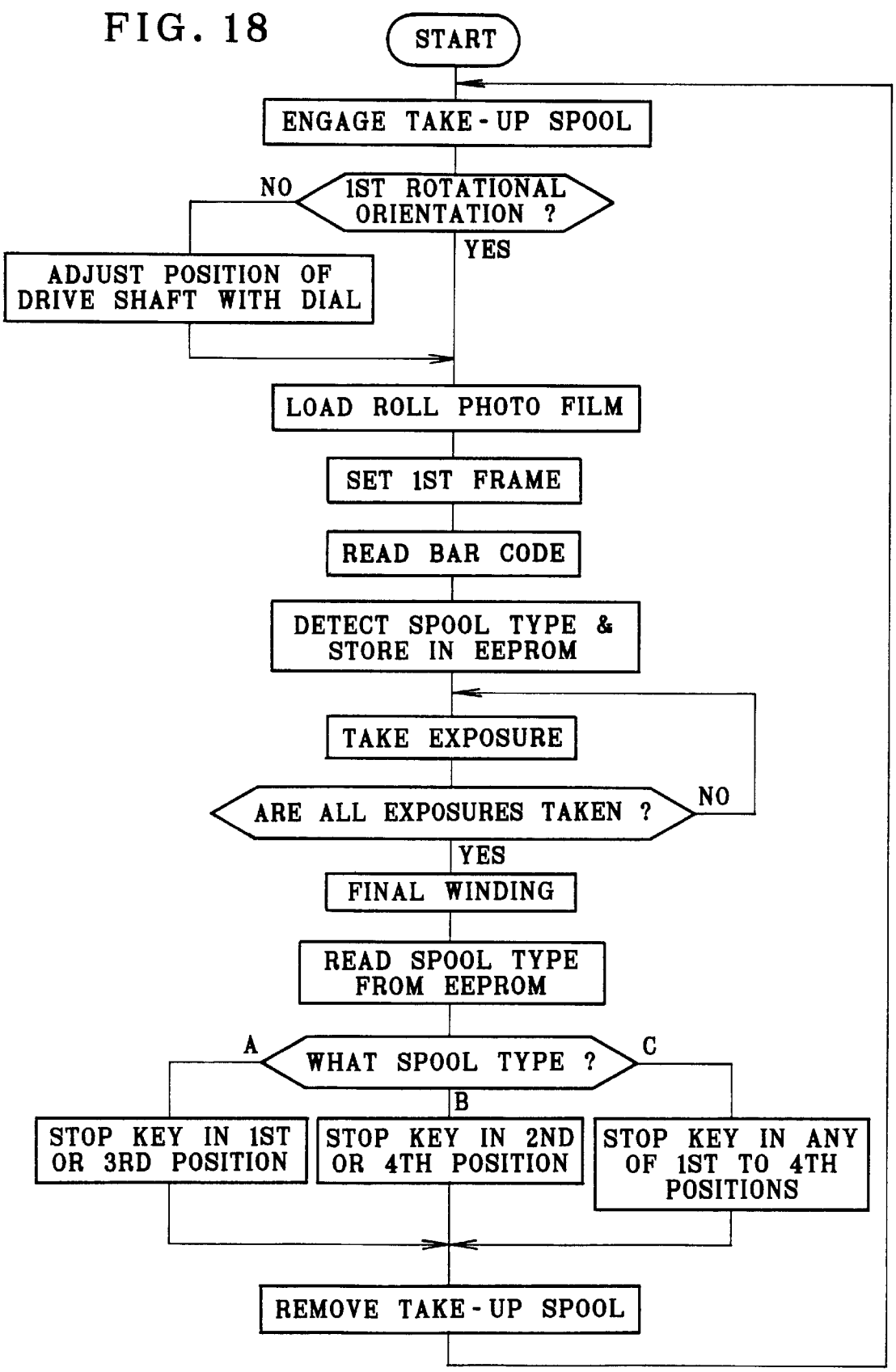
FIG. 18 is a flow chart illustrating a routine of automatic control of a stop position of the drive shaft by use of reading of the bar code.

Another preferred embodiment is depicted in FIG. 18, where the stop position of the key portion 45b of the drive shaft 45 according to the information read from the bar code 12 on the connective tape 8. The bar code 12 on the connective tape 8 of the roll photo film 1 consists of a discrimination code, which includes the spool type information of any one of the spools 2, 87 and 90, namely a relative direction of cutting of the key ways with reference to penetration of the insertion slit. Note that the spool type may be represented by discrimination code in an indirect manner in addition to a direct manner. For example the spool type information may be constituted by information of a manufacturer of the roll photo film, because it is general that the spool types depend on photo film manufacturers.

In this embodiment of FIG. 18, the bar code 12 of the roll photo film 1 being newly loaded is read during the first frame setting. Upon finishing the first frame setting, the bar code 12 is recognized to detect the photo film type and photo film speed, and also to discern the spool type by detecting the discrimination code. The discerned spool type is written to EEPROM 65c.

When all exposures have been taken, then the photo film is finally wound. Upon the finish of the final winding, the newest spool type is read from EEPROM 65c. In the event A that the spool 2 is judged to be used in the roll photo film 1, then a change in the drive shaft signal from the H (High) level to the L (Low) level is not considered. A change in the drive shaft signal from the L (Low) level to the H (High) level is detected when the key portion 45b comes to the first or third reference rotational position. In response to this, the speed of the motor 50 is decreased, before the key portion 45b is stopped in the first or third specified rotational position. The spool 2 being uncovered is engaged with the drive shaft 45, and comes to have the first rotational orientation.

In the event B that the spool 87 is judged to be used, then a change in the drive shaft signal from the L (Low) level to the H (High) level is not considered. A change in the drive shaft signal from the H (High) level to the L (Low) level is detected when the key portion 45b comes to the second or fourth reference rotational position. In response to this, the speed of the motor 50 is decreased, before the key portion 45b is stopped in the second or fourth specified rotational position. The take-up spool 87 being uncovered is engaged with the drive shaft 45, and comes to have the first rotational orientation.

In the event C that the spool 90 is judged to be used, then the key portion 45b is stopped in any of the first to fourth specified rotational positions. The take-up spool 90 being uncovered is engaged with the drive shaft 45. If the take-up spool 90 does not have the first rotational orientation, the adjustor dial 28 is rotated to set the take-up spool 90 in the first rotational orientation.

Figure 19:
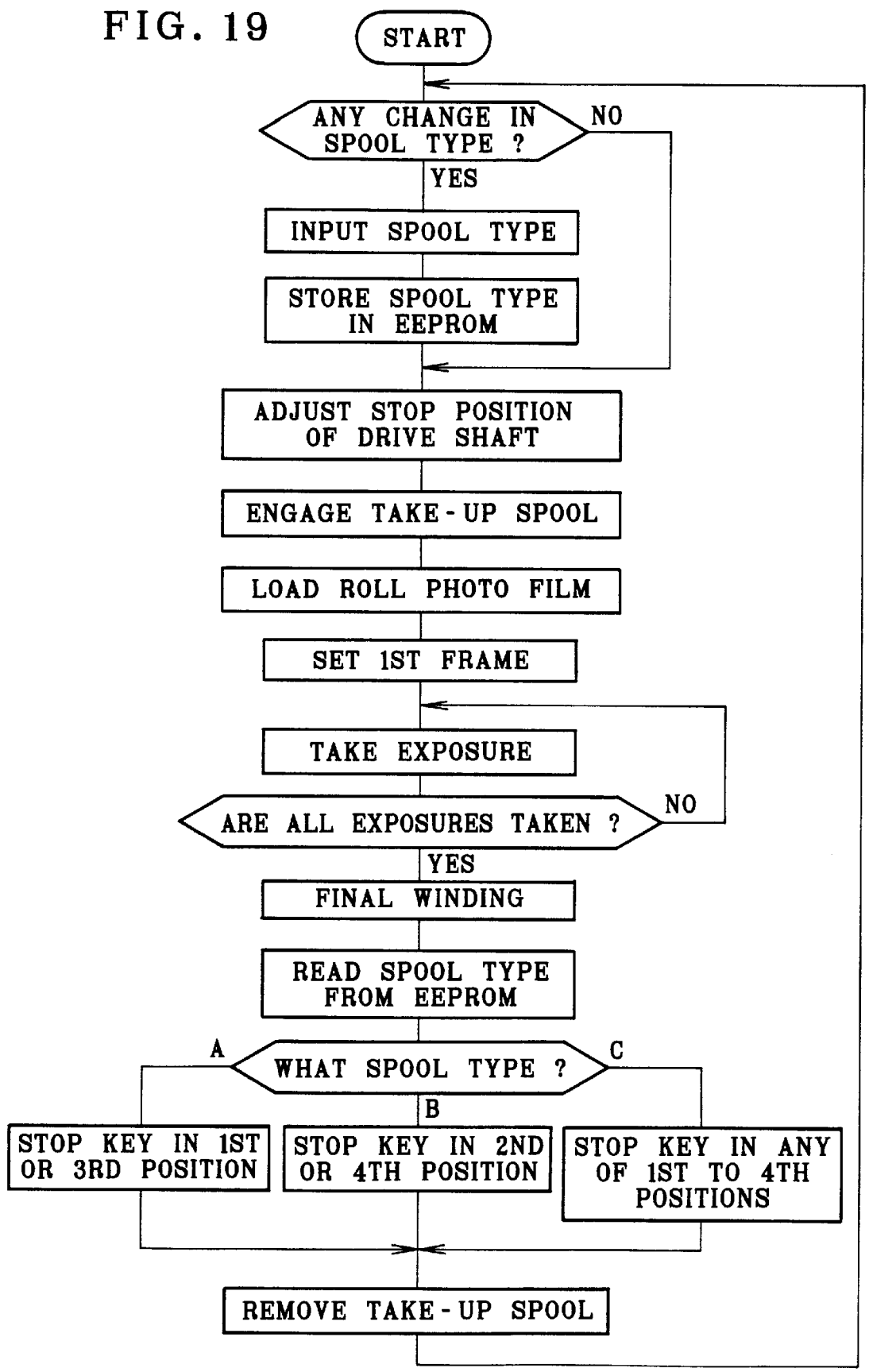
FIG. 19 is a flow chart illustrating another preferred routine of automatic control of a stop position of the drive shaft by use of a manually input spool type.

In FIG. 19, a preferred embodiment is depicted, in which a user inputs a particular one of the spool types into the camera 20 in view of his frequent use of a particular type of roll photo film. The user operates the adjustor dial 28 and the input pushbuttons 29 in combination, and inputs his selected one of the spool types for the roll photo film 1. Each time that the final winding is finished, the stop position of the key portion 45b is controlled according to the selected spool type in the same manner as the embodiment of FIG. 18. Note that it is possible to construct the camera with a selector for selecting one of first and second modes, including the first mode for stopping the key portion 45b in the first and third specified rotational positions, and the second mode for stopping the key portion 45b in the second and fourth specified rotational positions.

Figure 20:
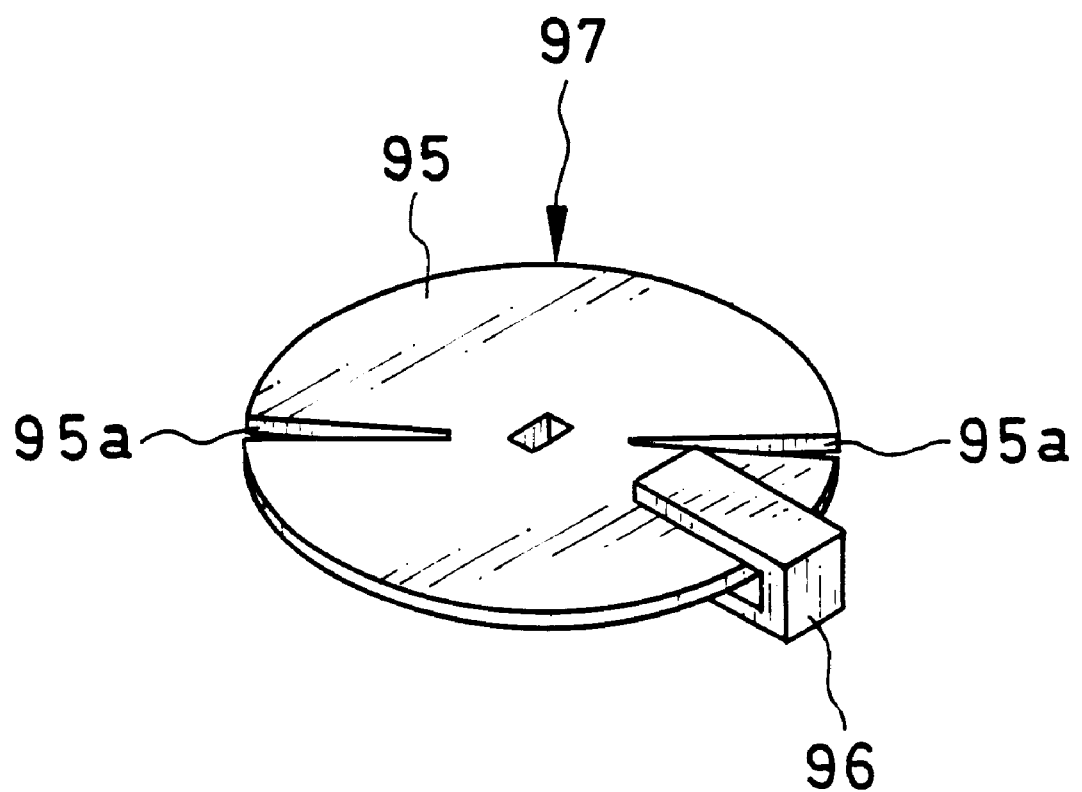
FIG. 20 is a perspective illustrating an encoder for outputting a drive shaft signal each time that the drive shaft makes half a rotation.

In the above embodiments, the rotational detector switch 57 is used as a second detector unit to detect rotation of the drive shaft 45 by 90 degrees. Alternatively an encoder 97 including a rotatable disk 95 of FIG. 20 may be used. The disk 95 has a pair of notches 95a, which are detected by a photo interrupter 96 as sensor. When the drive shaft 45 makes half a rotation or rotates by 180 degrees, the encoder 97 generates a drive shaft signal, to stop the key portion 45b in the first to fourth specified rotational positions.

In the present embodiment, a drive shaft signal is generated when the key portion 45b stops in the first and third reference rotational positions. To stop the key portion 45b in the first or third specified rotational position, the motor 50 is stopped when the rotation pulses of the number Ca are generated after the occurrence of the drive shaft signal. In contrast, for stopping the key portion 45b in the second or fourth specified rotational position, rotation pulses are counted after the occurrence of the drive shaft signal. The motor 50 is stopped when the rotation counter 71 counts the rotation pulses in the number of a sum of the number Ca and the number required to rotate the drive shaft 45 by 90 degrees. Note that it is possible instead of the rotational detector switch 57 to use an encoder for generating the drive shaft signal each time that the drive shaft 45 makes one rotation. For example such an encoder may include a rotatable disk similar to the disk 95 but with a single notch to be detected. Furthermore it is possible in the present invention to omit the motor encoder 53 from the camera. This variant, although having lower precision in the stop control is favorable in structural simplicity.

In the above embodiments, the key portion 45b is stopped in the specified rotational positions which are preset. Alternatively it is possible to construct the camera in which a user can manually determine and input specified rotational positions. For example, the adjustor dial 28 may be used for the inputting operation. The value Ca for use in controlling the stop positions of the drive shaft 45 may be input numerically. This is favorable in determination of the specified rotational positions in consideration of easy handling of a take-up spool for the user.

To input the value Ca, the numeral representing the value Ca may be expressed in the unit of the rotational angle, the number of rotations, time of continued rotation under a predetermined rotational speed, or the number of pulses itself. If the time of the continued rotation is used, time of the user's depression of the pushbutton may be used to input it.

Moreover it is possible instead of inputting the number Ca to construct the camera in which a take-up spool is rotated to a desired rotational position while the back lid 30 is open, so as to determine and store a stop position of the take-up spool, or the rotational position of the key portion 45*b* of the drive shaft 45. For example, a finger of a user rotates the drive shaft 45 to set the key portion 45*b* in his desired position while the back lid 30 is open. Then a pushbutton may be depressed or the back lid 30 may be closed to determine the stop position definitely. The CPU detects the change in the drive shaft signal shortly before the determination of the stop position of the key portion 45*b*, detects the number of rotation pulses generated after the change in the drive shaft signal and until the determination of the stop position, and writes them to EEPROM. After the final winding is finished, a change the same as the written change in the drive shaft signal is detected. After this, rotation pulses are counted. When rotation pulses in the number equal to the written number are generated, the drive shaft 45 is stopped.

In the above embodiments, the stop position of the drive shaft 45 is controlled upon the finish of the final winding succeeding to taking exposures to all the frames. Furthermore it is possible to stop the key portion 45*b* in specified rotational positions even when a winder button is depressed in the course of partially using the photo film to wind the photo film entirely about the take-up spool. Also, the stop control of the key portion 45*b* may be effected upon an operation of opening the back lid 30 or a prior operation required for opening the back lid 30. In the above embodiments, the camera has the back lid 30. Alternatively a camera can have a bottom lid, a side lid or any other lids different from the back lid 30, for the purpose of loading of the roll photo film and insertion of the take-up spool.

In the above embodiments, the adjustor dial 28 is used for manually adjusting the rotational position of the drive shaft 45 by 90 degrees while the back lid is open. This use of the adjustor dial 28 is also effective in the case where the drive shaft 45 is stopped in an irregular position between the four specified rotational positions. The drive shaft 45 can be returned to a nearest one of the four specified rotational positions by operating the adjustor dial 28.

In the above embodiments, upon the final winding after taking exposures on the previous meduim format photo film, the drive shaft 45 is stopped to orient the key portion 45*b* in the first or third specified rotational position. Note that, if the camera is unused after being purchased by the user, the camera has been previously adjusted in a factory in such a manner that the key portion 45*b* is stopped in the first or third specified rotational position. Of course it is alternatively possible to omit such an adjustment in the factory. For a user to use the new camera the user may effect an initial setting operation of adjusting the key portion 45*b* in the first or third specified rotational position. For this initial setting operation, the adjustor dial may be used for rotating the drive shaft 45, or the user's finger may touch, rotate and set the drive shaft 45.

Note that, in the above embodiments, the stop position of the drive shaft 45 is automatically controlled at the finish of the final winding. It is possible in the present invention to omit this automatic control of the stop position of the drive shaft 45, and to construct a camera only with the external adjustment of the stop position of the 45 by means of manual operation of the adjustor dial 28 while the back lid 30 is open. Also it is possible in the present invention to omit this external adjustment of the stop position of the 45 by means of manual operation of the adjustor dial 28, and to construct a camera only with this automatic control of the stop position of the drive shaft 45 at the finish of the final winding.

Now the detection of an error after in final winding is briefly referred to. During the final winding, the photo film roller 46 is used for checking whether the rear end of the meduim format photo film 5 is moved past it, and whether the meduim format photo film 5 stops being transported.

The rotational detector switch 57 is associated with the final gear 52, and constructed to change over between states of being turned on and off each time that the drive shaft 45 rotates by 90 degrees. The rotational detector switch 57 operates not only for controlling the stop position of the key portion 45*b* but also for detecting whether the drive shaft 45 has stopped rotation, for the purpose of estimation of an error or accident in the course of the final winding.

The rotational detector switch 57 is used for controlling the stop position of the drive shaft 45 or the orientation of the key portion 45*b*. The photo film roller 46 is used for measuring a transporting length of the photo film-strip 3. Accordingly occurrence of an error in the final winding can be checked without any further relevant mechanism. It is possible to avoid a rise in the manufacturing cost of the camera.

Note that, even when a winder button of the camera is depressed in the course of partially using the photo film, it is possible to detect the error or accident in the final winding before winding the meduim format photo film 5 entirely about the take-up spool. Note that this winder button is disposed inside a bottom hole of the camera of FIG. 8, and only depressible with a tapered tool such as a tip of the pen.

In the above embodiments, the rotational detector switch is used for detecting the stop of the drive shaft. Alternatively a motor encoder may be used for detecting the stop of the drive shaft. It is possible that, when there is an error or accident in the final winding, a warning unit of the camera warns a user, for example by driving a light-emitting diode (LED) in a viewfinder or by emitting alarm sound.

In the above embodiments, the time Ta is used to evaluate the normal or abnormal state of the final winding of the meduim format photo film 5. It is possible that a rare case of simultaneous occurrence of the stop of the drive shaft 45 and the lapse of the time Ta is determined as either normal or abnormal, in a manner as desired in view of convenience.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera for use with a roll photo film, said roll photo film including a photo filmstrip on which plural frames are formable serially, a light-shielding leader disposed on a front end of said photo filmstrip, a light-shielding trailer disposed on a rear end of said photo filmstrip, said roll photo film being wound about a supply spool with said trailer positioned inside and with said leader positioned outside, said camera comprising:

a photo film supply chamber for loading of said roll photo film;

a photo film take-up chamber, having a take-up spool disposed in a rotatable manner, for winding said roll photo film from said photo film supply chamber, said take-up spool including a spool core, an insertion slit, formed through said spool core, for receiving insertion of said leader, and a shaft insertion hole, formed in an end of said spool core, said shaft insertion hole including an axial hole, and a key way extending form said axial hole;

a drive shaft, disposed in said photo film take-up chamber, for rotating said take-up spool, to wind said roll photo film about said take-up spool, said drive shaft comprising:

a shaft portion insertable in said axial hole; and a key portion, disposed on periphery of said shaft portion, engageable with said key way, for transmitting rotation of said shaft portion to said take-up spool;

a motor for rotating said drive shaft;

a first detector unit for detecting a rotational position of said drive shaft; and a controller for controlling said motor in accordance with a signal from said first detector unit, to set said drive shaft in at least one specified rotational position before insertion of said leader into said insertion slit, said insertion slit being directed in a predetermined orientation for facilitating receipt of said leader;

wherein said controller causes said motor to rotate for winding said roll photo film about said take-up spool by a unit length, and to rotate continuously for winding an entirety of said roll photo film about said take-up spool after a final frame is exposed on said photo filmstrip; and wherein said controller sets said drive shaft in said at least one specified rotational position after an entirety of said photo filmstrip is wound about said take-up spool, to direct said insertion slit of another take-up spool in said predetermined orientation when said other take-up spool is engaged with said drive shaft.

2. A camera as defined in claim 1, wherein said first detector unit detects existence of said drive shaft in at least one reference rotational position, said at least one reference rotational position being offset by a predetermined phase difference from said specified rotational position; and further comprising:

a second detector unit for detecting a rotating amount of said motor;

a memory for storing at least one predetermined rotating amount, said predetermined rotating amount being an amount by which said motor rotates to cause said drive shaft to rotate by said predetermined phase difference;

wherein said controller considers signals from said first and second detector units and said predetermined rotating amount, and stops said motor in response to said motor reaching said predetermined rotating amount after said drive shaft reaches said reference rotational position, for setting said drive shaft in said specified rotational position.

3. A camera as defined in claim 2, wherein said second detector unit includes:

a rotatable disk, secured to a motor shaft of said motor, and rotatable together therewith;

a sector opening, formed in said rotatable disk, and having an arc shape with reference to a rotational center thereof;

a sensor for detecting said sector opening, to determine a unit rotating amount of said motor; and a counter for counting said unit rotating amount to determine said rotating amount of said motor.

4. A camera as defined in claim 2, wherein said at least one specified rotational position includes first and second specified rotational positions determined with a phase difference of half a rotation therebetween; and said at least one reference rotational position includes first and second reference rotational positions determined with said predetermined phase difference respectively from said first and second specified rotational positions.

5. A camera as defined in claim 4, wherein said key way is arranged in said take-up spool one of parallel to a direction of penetration of said insertion slit and perpendicular to said direction of penetration of said insertion slit; and wherein said at least one specified rotational position further includes third and fourth specified rotational positions, said third specified rotational position having a phase difference of a one fourth rotation from said first specified rotational position, and said fourth specified rotational position having a phase difference of a three fourths rotation from said first specified rotational position, there being a phase angle of one fourth rotation between any adjacent two of said first to fourth specified rotational positions.

6. A camera as defined in claim 5, further comprising an external input unit, operable externally before insertion of said leader into said insertion slit, for generating a drive shaft set signal;

wherein said controller causes said motor to rotate in response to said drive shaft set signal, to set said drive shaft in a succeeding one of said first to fourth specified rotational positions.

7. A camera as defined in claim 5, wherein said first detector unit generates a first drive shaft signal when said drive shaft reaches said first and second reference rotational positions, and generates a second drive shaft signal when said drive shaft reaches said third and fourth reference rotational positions, said third and fourth reference rotational positions being offset by said predetermined phase difference respectively from said third and fourth specified rotational positions.

8. A camera as defined in claim 7, wherein said first detector unit includes:

a rotatable disk, rotatable together with said drive shaft;

first and second contact patterns, arranged on one face of said disk, and having respective sector shapes, said first contact pattern having a central angle of substantially 270 degrees, and said second contact pattern having a central angle of substantially 90 degrees; and first and second contact segments, disposed to extend to said one face of said disk, arranged with a phase difference of half a rotation with reference to a rotational center of said disk, for contacting said first and second contact patterns, wherein when both said first and second contact segments contact said first contact pattern, then said first and second contact segments are electrically connected to each other, to generate one of said first and second drive shaft signals, and when one of said first and second contact segments contacts said first contact pattern and a remaining one of said first and second contact segments contacts said second contact pattern, then said first and second contact segments are electrically disconnected from each other, to generate a remaining one of said first and second drive shaft signals.

9. A camera as defined in claim 7, wherein said take-up spool is one type selected from at least first and second types, said first type having said key way arranged parallel to a direction of penetration of said insertion slit, and said second type having said key way arranged perpendicular to said direction of penetration of said insertion slit;

said memory storing said first to fourth specified rotational positions, said first to fourth specified rotational positions being associated with either of said first and second types;

further comprising a type selector for selectively setting one of said first and second types;

wherein said controller uses at least one of said plural specified rotational positions for stopping said drive shaft in accordance with said first or second type being selected.

10. A camera as defined in claim 9, wherein said controller, when said first type is selected, stops said motor in response to said motor reaching said predetermined rotating amount after said first drive shaft signal is generated, for setting said drive shaft in said first or second specified rotational position, and when said second type is selected, stops said motor in response to said motor reaching said predetermined rotating amount after said second drive shaft signal is generated, for setting said drive shaft in said third or fourth specified rotational position.

11. A camera as defined in claim 5, wherein said first detector unit includes:

a rotational disk, rotatable together with said drive shaft;

first and second notches, arranged in said disk in association with said first and second reference rotational positions, and disposed with a phase difference of half a rotation from each other; and a sensor for detecting said first and second notches to generate a drive shaft signal.

12. A camera as defined in claim 5, wherein said take-up spool is one type selected from at least first and second types, said first type having said key way arranged parallel to a direction of penetration of said insertion slit, and said second type having said key way arranged perpendicular to said direction of penetration of said insertion slit;

said memory storing said first to fourth specified rotational positions, said first and second specified rotational positions being associated with said first type, said third and fourth specified rotational positions being associated with said second type;

further comprising a type selector for selectively setting one of said first and second types;

wherein said first detector unit generates a drive shaft signal when said drive shaft reaches said first and second reference rotational positions;

said at least one predetermined rotating amount is first and second predetermined rotating amounts, said first predetermined rotating amount being an amount by which said motor rotates to cause said drive shaft to rotate by said predetermined phase difference, said second predetermined rotating amount being an amount by which said motor rotates to cause said drive shaft to rotate by a sum value obtained by addition of said predetermined phase difference to a value of a one fourth rotation;

said controller, when said first type is selected, stopping said motor in response to said motor reaching said first predetermined rotating amount after said drive shaft signal is generated, for setting said drive shaft in one of said first and second specified rotational positions, and when said second type is selected, stopping said motor in response to said motor reaching said second predetermined rotating amount after said drive shaft signal is generated, for setting said drive shaft in one of said third and fourth specified rotational positions.

13. A camera as defined in claim 2, wherein said roll photo film further includes:

a connective tape for connecting said leader with a front end of said photo filmstrip;

a discrimination code, prerecorded on at least one of said connective tape, said leader and said spool, for representing type information of one type selected from at least first and second types, said first type having said key way arranged parallel to a direction of penetration of said insertion slit, and said second type having said key way arranged perpendicular to said direction of penetration of said insertion slit;

further comprising a code reader for reading said discrimination code after said roll photo film is loaded;

wherein said at least one specified rotational position is plural specified rotational positions, stored in said memory, and associated with either one of said first and second types;

said controller detecting said type information in accordance with a signal from said code reader, and using at least one of said plural specified rotational positions for stopping said drive shaft in accordance with said type information being detected.

14. A camera as defined in claim 2, further comprising an external input unit, externally operable, for determining said predetermined rotating amount.

15. A camera as defined in claim 2, further comprising an openable lid member for closing said photo film take-up chamber, said take-up spool being insertable in said photo film take-up chamber while said lid member is open;

wherein said drive shaft is rotated and positioned by external operation while said lid member is open, and said controller determines said specified rotational position with a rotational position of said drive shaft positioned by said external operation, and writes said rotational position to said memory.

16. A camera as defined in claim 15, wherein said first detector unit generates a drive shaft signal upon reaching said reference rotational position;

said controller determining said predetermined rotating amount based upon an amount of rotation made by said motor during a period beginning with generation of said drive shaft signal prior to positioning of said drive shaft and ending with positioning of said drive shaft, in accordance with signals from said first and second detector units while said drive shaft is rotated by said external operation, said controller writing said rotating amount to said memory.

17. A camera as defined in claim 2, further comprising a speed reduction mechanism, connected between said motor and said drive shaft, for causing said drive shaft in response to rotation of said motor to rotate more slowly than does said motor.

18. A camera as defined in claim 2, wherein said take-up spool is one of first, second and third types, said key ways being any of a first key way of said first type, a second key way of said second type, and a pair of third key ways of said third type;

said first key way extending parallel to a direction of penetration of said insertion slit;

said second key way extending perpendicular to said direction of penetration of said insertion slit; and said third key ways including one key way and another key way, said one key way extending parallel to said direction of penetration of said insertion slit, and said other key way extending perpendicular to said direction of penetration of said insertion slit.

19. A camera as defined in claim 1, further comprising an external input unit, operated externally before insertion of said leader into said insertion slit, for generating a drive shaft set signal;

wherein said controller causes said motor to rotate in response to said drive shaft set signal, to set said drive shaft in said at least one specified rotational position.

20. A camera as defined in claim 19, further comprising:

an openable lid member for closing said photo film take-up chamber, said take-up spool being insertable in said photo film take-up chamber while said lid member is open;

a lid switch for generating an open signal representing an opened state of said lid member;

wherein said controller rotates said motor if said drive shaft signal is generated while said open signal is generated, to set said drive shaft in said at least one specified rotational position.

21. A camera as defined in claim 20, wherein said at least one specified rotational position is plural specified rotational positions;

said controller rotating said drive shaft signal in a predetermined rotational direction and stepwise between said plural specified rotational positions each time that said drive shaft set signal is generated.

22. A camera as defined in claim 21, wherein said plural specified rotational positions are four specified rotational positions having a respective phase difference of a one fourth rotation therebetween.

23. A camera as defined in claim 22, wherein said external input unit is a pushbutton or a dial.

24. A camera as defined in claim 1, further comprising:

a photo film roller, rotatable by contact with said roll photo film being transported;

a roller rotation detector for detecting rotation of said photo film roller;

a timer for measuring elapsed time;

wherein after exposures are taken on an entirety of said photo filmstrip, said controller causes said motor to rotate continuously and starts said timer in response to a stop of rotation of said photo film roller according to a signal from said roller rotation detector, said controller determining that said roll photo film has finished being wound about said take-up spool upon reaching said elapsed time to a predetermined time, and stopping said motor to set said drive shaft in said at least one specified rotational position.

25. A camera as defined in claim 24, wherein said controller judges that winding of said roll photo film about said take-up spool is unacceptable if a stop of rotation of said drive shaft is detected according to a signal from said first detector unit before reaching said elapsed time to said predetermined time.

26. A camera as defined in claim 25, further comprising an indicator, controlled by said controller, for indicating an unacceptable state if said controller judges that said winding of said roll photo film about said take-up spool is unacceptable.

27. A camera as defined in claim 24, wherein said roller rotation detector includes:

a rotary encoder for detecting a unit rotating amount of rotation of said photo film roller; and a transport counter for counting said unit rotating amount to detect a rotating amount of said photo film roller, so as to measure a transported length of said roll photo film.

28. A camera for use with a roll photo film, said roll photo film including a photo filmstrip on which plural frames are formable serially, a light-shielding leader disposed on a front end of said photo filmstrip, a light-shielding trailer disposed on a rear end of said photo filmstrip, said roll photo film being wound about a supply spool with said trailer positioned inside and with said leader positioned outside, said camera comprising:

a photo film supply chamber for loading of said roll photo film;

a photo film take-up chamber, having a take-up spool disposed in a rotatable manner, for winding said roll photo film from said photo film supply chamber;

a drive shaft, disposed in said photo film supply chamber, for rotating said take-up spool, to wind said roll photo film about said take-up spool;

a motor for rotating said drive shaft;

a first detector unit for detecting a rotational position of said drive shaft;

a photo film roller, rotated by contact with said roll photo film being transported;

a roller rotation detector for detecting rotation of said photo film roller;

a timer for measuring elapsed time;

a controller for controlling said motor and said timer, wherein after exposures are taken on an entirety of said photo filmstrip, said controller causes said motor to rotate continuously, starts said timer in response to a stop of rotation of said photo film roller according to a signal from said roller rotation detector, judges that said roll photo film has finished being wound about said take-up spool upon reaching of said elapsed time to a predetermined time, and stops said motor.

29. A camera as defined in claim 28, wherein said controller judges that winding of said roll photo film about said take-up spool is unacceptable if a stop of rotation of said drive shaft is detected according to a signal from said first detector unit before reaching said elapsed time to said predetermined time.

30. A camera as defined in claim 29, further comprising an indicator, controlled by said controller, for indicating an unacceptable state if said controller judges that said winding of said roll photo film about said take-up spool is unacceptable.

31. A camera as defined in claim 28, wherein said roller rotation detector includes:

a rotary encoder for detecting a unit rotating amount of rotation of said photo film roller; and a transport counter for counting said unit rotating amount to detect a rotating amount of said photo film roller, so as to measure a transported length of said roll photo film.

* * * * *